United States Patent
Sambhwani et al.

(10) Patent No.: US 12,316,366 B2
(45) Date of Patent: May 27, 2025

(54) ELECTRONIC DEVICES WITH HIERARCHICAL MANAGEMENT OF RADIO-FREQUENCY EXPOSURE

(71) Applicant: Apple Inc., Cupertino, CA (US)

(72) Inventors: Sharad Sambhwani, San Diego, CA (US); Digvijay A. Jadhav, San Jose, CA (US); Dirk Nickisch, Oberpframmern (DE); Gil Katzir, San Diego, CA (US); Laxminarayana Pillutla, San Diego, CA (US)

(73) Assignee: Apple Inc., Cupertino, CA (US)

( * ) Notice: Subject to any disclaimer, the term of this patent is extended or adjusted under 35 U.S.C. 154(b) by 412 days.

(21) Appl. No.: 17/868,513

(22) Filed: Jul. 19, 2022

(65) Prior Publication Data
US 2022/0368366 A1 Nov. 17, 2022

Related U.S. Application Data

(63) Continuation of application No. 17/318,927, filed on May 12, 2021, now Pat. No. 11,438,023.

(51) Int. Cl.
H04B 1/38 (2015.01)
H04B 1/3827 (2015.01)
H04W 24/08 (2009.01)

(52) U.S. Cl.
CPC .......... *H04B 1/3838* (2013.01); *H04W 24/08* (2013.01)

(58) Field of Classification Search
CPC ......... H04B 1/3838; H04B 2001/3844; H04W 24/08
See application file for complete search history.

(56) References Cited

U.S. PATENT DOCUMENTS

| | | | |
|---|---|---|---|
| 8,417,296 B2 | 4/2013 | Caballero et al. | |
| 8,432,322 B2 | 4/2013 | Amm et al. | |
| 8,466,839 B2 | 6/2013 | Schlub et al. | |
| 8,781,420 B2 | 7/2014 | Schlub et al. | |
| 9,602,919 B2 | 3/2017 | Caballero et al. | |
| 2019/0215765 A1 | 7/2019 | Ramasamy et al. | |
| 2023/0361798 A1* | 11/2023 | Kaidar | H04B 1/3838 |

OTHER PUBLICATIONS

U.S. Appl. No. 17/200,311, filed Mar. 12, 2021.

* cited by examiner

*Primary Examiner* — Keith Ferguson
(74) *Attorney, Agent, or Firm* — Treyz Law Group, P.C.; Michael H. Lyons

(57) ABSTRACT

An electronic device may include a first set of radios subject to a specific absorption rate (SAR) limit and a second set of radios subject to a maximum permissible exposure (MPE) limit over an averaging period. Control circuitry may dynamically adjust radio-frequency (RF) exposure metric budgets provided to the radios over the averaging period, based on feedback reports from the radios identifying the amount of SAR and MPE consumed by the radios during different subperiods of the averaging period. The control circuitry may distribute and adjust SAR budgets and MPE budgets across the radios based on the feedback reports, distribution policies, radio statuses, transmit activity factors, and/or usage ratios associated with the radios. This may provide efficient utilization of the total available SAR and MPE budget, thereby leading to increased uplink coverage and throughput relative to scenarios where the SAR and MPE budgets remain static.

20 Claims, 7 Drawing Sheets

ELECTRONIC DEVICES WITH HIERARCHICAL MANAGEMENT OF RADIO-FREQUENCY EXPOSURE

This application is a continuation of U.S. patent application Ser. No. 17/318,927, filed May 12, 2021, which is hereby incorporated by reference herein in its entirety.

FIELD

This disclosure relates generally to electronic devices and, more particularly, to electronic devices with wireless circuitry.

BACKGROUND

Electronic devices are often provided with wireless capabilities. An electronic device with wireless capabilities has wireless circuitry that includes one or more antennas. The antennas transmit radio-frequency signals. During transmission, the radio-frequency signals are sometimes incident upon nearby external objects such as the body of a user or another person.

Electronic devices with wireless capabilities are typically operated in geographic regions that impose regulatory limits on the amount of radio-frequency exposure produced by the electronic device in transmitting radio-frequency signals. It can be challenging to design electronic devices that meet these regulatory limits. In addition, it can be difficult to efficiently operate the wireless circuitry in multiple different radio-frequency bands while continuing to meet the regulatory limits.

SUMMARY

An electronic device may include wireless circuitry controlled by one or more processors. The wireless circuitry may include radios that transmit radio-frequency signals using at least one antenna. The radios may include a first set of one or more radios that transmit radio-frequency signals at frequencies less than 6 GHz. The radios may include a second set of one or more radios that transmit radio-frequency signals at frequencies greater than 6 GHz. The first set of radios may be subject to a regulatory specific absorption rate (SAR) limit over a regulatory averaging period. The second set of radios may be subject to a regulatory maximum permissible exposure (MPE) limit over the regulatory averaging period.

The wireless circuitry may include a radio-frequency (RF) exposure metric manager. The RF exposure metric manager may dynamically adjust RF exposure metric budgets provided to the first and second sets of radios over the averaging period based on feedback reports from the first and second sets of radios. For example, the first set of radios may generate feedback reports identifying the amount of SAR consumed by the radios during a first subperiod of the averaging period. The second set of radios may generate feedback reports identifying the amount of MPE consumed by the radios during the first subperiod. The RF exposure metric manager may generate an average SAR value based on the amount of SAR consumed by the first set of radios during the first subperiod and any prior subperiods of the averaging period. The RF exposure metric manager may generate an average MPE value based on the amount of MPE consumed by the second set of radios during the first subperiod and any prior subperiods of the averaging period. The RF exposure metric manager may generate a total exposure ratio (TER) value based on the average SAR value and the average MPE value. The RF exposure metric manager may generate a remaining SAR value based on the average SAR value and the regulatory SAR limit, a remaining MPE value based on the average MPE value and the regulatory MPE limit, and a remaining TER value based on the TER value.

The RF exposure manager may generate an overall SAR budget and an overall MPE budget based on the remaining TER value and a SAR allocation from a SAR/MPE split policy. The RF exposure manager may distribute the overall MPE budget into MPE budgets for the second set of radios when the overall MPE budget is less than the remaining MPE value. The RF exposure manager may distribute the remaining MPE value into MPE budgets for the second set of radios when the overall MPE budget is greater than or equal to the remaining MPE value. The RF exposure manager may distribute the overall SAR budget into SAR budgets for the first set of radios when the overall SAR budget is less than the remaining SAR value. The RF exposure manager may distribute the remaining SAR value into SAR budgets for the first set of radios when the overall SAR budget is greater than or equal to the remaining SAR value. The distribution may be made based on distribution policies, radio statuses, transmit activity factors, and/or usage ratios associated with the radios. This may result in more efficient utilization of the total available SAR and MPE budget, thereby leading to increased uplink coverage and throughput relative to scenarios where the SAR and MPE budgets remain static.

An aspect of the disclosure provides an electronic device. The electronic device can include a first radio configured to wirelessly transmit first radio-frequency signals during a sub-period of an averaging period and pursuant to a first radio-frequency (RF) exposure metric budget. The first radio can be configured to generate a first report indicative of an amount of a first RF exposure metric consumed by the first radio during the sub-period. The electronic device can include a second radio configured to wirelessly transmit second radio-frequency signals during the sub-period and pursuant to a second RF exposure metric budget. The second radio can be configured to generate a second report indicative of an amount of a second RF exposure metric consumed by the second radio during the sub-period. The second RF exposure metric can be different from the first RF exposure metric. The electronic device can include one or more processors. The one or more processors can be configured to receive the first report from the first radio and the second report from the second radio. The one or more processors can be configured to update the first RF exposure metric budget based at least in part on the amount of the second RF exposure metric consumed by the second radio during the sub-period. The first radio can be configured to transmit third radio-frequency signals during a subsequent sub-period of the averaging period and pursuant to the updated first RF exposure metric budget.

An aspect of the disclosure provides a method of operating an electronic device having one or more processors and a set of radios. The method can include, with the set of radios, transmitting first radio-frequency signals during a first subperiod of an averaging period and identifying an amount of a radio-frequency (RF) exposure metric consumed by the set of radios during the first subperiod. The method can include, with the one or more processors, generating an average RF exposure metric value by averaging the amount of the RF exposure metric consumed by the set of radios with an amount of the RF exposure metric consumed by the set of radios during at least a second subperiod of the averaging period that is prior to the first subperiod. The method can include, with the one or more processors, generating an overall budget for the RF exposure metric based at least in part on the average RF exposure metric value. The method can include, with the one or more processors, distributing the overall budget for the RF exposure metric into respective RF exposure metric budgets for the radios in the set of radios. The method can include, with the set of radios, transmitting second radio-frequency signals during a third subperiod of the averaging period and pursuant to the RF exposure metric budgets, the third subperiod being subsequent to the first subperiod.

An aspect of the disclosure provides an electronic device. The electronic device can include a first radio configured to wirelessly transmit first radio-frequency signals at a frequency less than 6 GHz during a first sub-period of an averaging period. The electronic device can include a second radio configured to wirelessly transmit second radio-frequency signals at a frequency greater than 6 GHz during the first sub-period. The electronic device can include one or more processors. The one or more processors can be configured to generate an average specific absorption rate (SAR) consumed by at least the first radio during the first sub-period and during at least a second sub-period of the averaging period, the second sub-period being prior to the first sub-period. The one or more processors can be configured to generate an average maximum permissible exposure (MPE) consumed by at least the second radio during the first sub-period and during at least the second sub-period. The one or more processors can be configured to generate a total exposure ratio (TER) value based on the average SAR, the average MPE, a first limit on an amount of SAR consumed by the electronic device over the averaging period, and a second limit on an amount of MPE consumed by the electronic device over the averaging period. The one or more processors can be configured to generate a SAR budget based at least on the TER value. The first radio can be configured to transmit third radio-frequency signals during a third sub-period of the averaging period and pursuant to the SAR budget, the third sub-period being after the first sub-period. The one or more processors can be configured to generate an MPE budget based on the TER value. The second radio can be configured to transmit fourth radio-frequency signals during the third sub-period and pursuant to the MPE budget.

DETAILED DESCRIPTION

Figure 1:
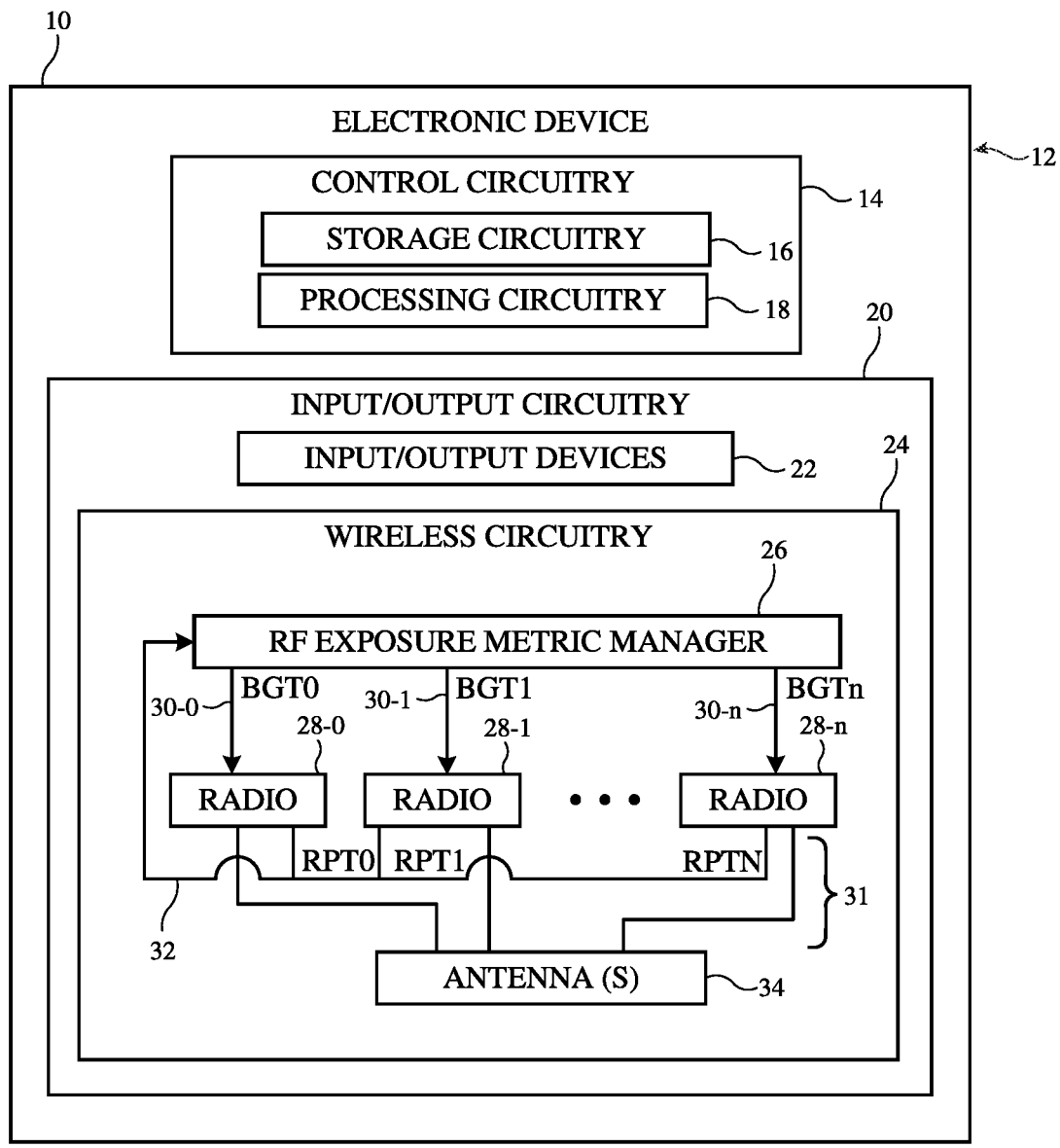
FIG. 1 is a block diagram of an illustrative electronic device having wireless circuitry with multiple radios and a radio-frequency (RF) exposure metric manager in accordance with some embodiments.

Electronic device 10 of FIG. 1 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment.

As shown in the functional block diagram of FIG. 1, device 10 may include components located on or within an electronic device housing such as housing 12. Housing 12, which may sometimes be referred to as a case, may be formed of plastic, glass, ceramics, fiber composites, metal (e.g., stainless steel, aluminum, metal alloys, etc.), other suitable materials, or a combination of these materials. In some situations, parts or all of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may include control circuitry 14. Control circuitry 14 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 16 may include storage that is integrated within device 10 and/or removable storage media.

Control circuitry 14 may include processing circuitry such as processing circuitry 18. Processing circuitry 18 may be used to control the operation of device 10. Processing circuitry 18 may include on one or more processors, microprocessors, microcontrollers, digital signal processors, host processors, baseband processor integrated circuits, application specific integrated circuits, central processing units (CPUs), etc. Control circuitry 14 may be configured to perform operations in device 10 using hardware (e.g., dedicated hardware or circuitry), firmware, and/or software. Software code for performing operations in device 10 may be stored on storage circuitry 16 (e.g., storage circuitry 16 may include non-transitory (tangible) computer readable storage media that stores the software code). The software code may sometimes be referred to as program instructions, software, data, instructions, or code. Software code stored on storage circuitry 16 may be executed by processing circuitry 18.

Control circuitry 14 may be used to run software on device 10 such as satellite navigation applications, internet browsing applications, voice-over-internet-protocol (VW) telephone call applications, email applications, media playback applications, operating system functions, etc. To support interactions with external equipment, control circuitry 14 may be used in implementing communications protocols. Communications protocols that may be implemented using control circuitry 14 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), or any other desired communications protocols. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch sensors, displays (e.g., touch-sensitive and/or force-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 22 may be peripherals that are coupled to a main processing unit or other portion of device 10 via a wired or wireless link).

Input-output circuitry 20 may include wireless circuitry 24 to support wireless communications and/or radio-based spatial ranging operations. Wireless circuitry 24 may include one or more antennas 34. Wireless circuitry 24 may also include n+1 radios 28 (e.g., a first radio 28-0, a second radio 28-1, an (n+1)th radio 28-n, etc.). Each radio 28 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 34. The components of each radio 28 may be mounted onto a respective substrate or integrated into a respective integrated circuit, chip, package, or system-on-chip (SOC). If desired, the components of multiple radios 28 may share a single substrate, integrated circuit, chip, package, or SOC.

Antenna(s) 34 may be formed using any desired antenna structures. For example, antenna(s) 34 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Filter circuitry, switching circuitry, impedance matching circuitry, and/or other antenna tuning components may be adjusted to adjust the frequency response and wireless performance of antenna(s) 34 over time.

Transceiver circuitry in radios 28 may convey radio-frequency signals using one or more antennas 34 (e.g., antenna(s) 34 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 34 may transmit the radio-frequency signals by radiating the radio-frequency signals into free space (or to free space through intervening device structures such as a dielectric cover layer). Antenna(s) 34 may additionally or alternatively receive the radio-frequency signals from free space (e.g., through intervening devices structures such as a dielectric cover layer). The transmission and reception of radio-frequency signals by antenna(s) 34 each involve the excitation or resonance of antenna currents on an antenna resonating element in the antenna by the radio-frequency signals within the frequency band(s) of operation of the antenna.

Each radio 28 may be coupled to one or more antennas 34 over one or more radio-frequency transmission lines 31. Radio-frequency transmission lines 31 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 31 may be integrated into rigid and/or flexible printed circuit boards if desired. One or more radio-frequency lines 31 may be shared between radios 28 if desired. Radio-frequency front end (RFFE) modules may be interposed on one or more radio-frequency transmission lines 31. The Radio-frequency front end modules may include substrates, integrated circuits, chips, or packages that are separate from radios 28 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 31.

Radios 28 may use antenna(s) 34 to transmit and/or receive radio-frequency signals within different frequency bands at radio frequencies (sometimes referred to herein as communications bands or simply as a "bands"). The frequency bands handled by radios 28 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHz, 3G bands, 4G LTE bands, 5G New Radio Frequency Range 1 (FR1) bands below 10 GHz, 5G New Radio Frequency Range 2 (FR2) bands between 20 and 60 GHz, etc.), other centimeter or millimeter wave frequency bands between 10-300 GHz, near-field communications (NFC) frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

Each radio 28 may transmit and/or receive radio-frequency signals according to a respective radio access technology (RAT) that determines the physical connection methodology for the components in the corresponding radio. One or more radios 28 may implement multiple RATs if desired. As just one an example, the radios 28 in device 10 may include a UWB radio 28-0 for conveying UWB signals using one or more antennas 34, a Bluetooth (BT) radio 28-1 for conveying BT signals using one or more antennas 34, a Wi-Fi radio 28-3 for conveying WLAN signals using one or more antennas 34, a cellular radio 28-4 for conveying cellular telephone signals using one or more antennas 34 (e.g., in 4G frequency bands, 5G FR1 bands, and/or 5G FR2 bands), an NFC radio 28-5 for conveying NFC signals using one or more antennas 34, and a wireless charging radio 28-6 for receiving wireless charging signals using one or more antennas 34 for charging a battery on device 10. This example is merely illustrative and, in general, radios 28 may include any desired combination of radios for covering any desired combination of RATs.

Radios 28 may use antenna(s) 34 to transmit and/or receive radio-frequency signals to convey wireless communications data between device 10 and external wireless communications equipment (e.g., one or more other devices such as device 10, a wireless access point or base station, etc.). Wireless communications data may be conveyed by radios 28 bidirectionally or unidirectionally. The wireless communications data may, for example, include data that has been encoded into corresponding data packets such as wireless data associated with a telephone call, streaming media content, internet browsing, wireless data associated with software applications running on device 10, email messages, etc. Radios 28 may also use antenna(s) 34 to perform spatial ranging operations (e.g., for identifying a distance between device 10 and an external object such as external object 8). Radios 28 that perform spatial ranging operations may include radar circuitry if desired (e.g., frequency modulated continuous wave (FMCW) radar circuitry, OFDM radar circuitry, FSCW radar circuitry, a phase coded radar circuitry, other types of radar circuitry).

During radio-frequency signal transmission, some of the radio-frequency signals transmitted by antenna(s) 34 may be incident upon external objects such as external object 8. External object 8 may be, for example, the body of the user of device 10 or another human or animal. In these scenarios, the amount of radio-frequency energy exposure at external object 8 may be characterized by one or more radio-frequency (RF) exposure metrics. The RF exposure metrics may include specific absorption rate (SAR) for radio-frequency signals at frequencies less than 6 GHz (in units of W/kg), maximum permissible exposure (MPE) for radio-frequency signals at frequencies greater than 6 GHz (in units of $mW/cm^2$), and total exposure ratio (TER), which combines SAR and MPE.

Regulatory requirements often impose limits on the amount of RF energy exposure permissible for external object 8 within the vicinity of antenna(s) 34 over a specified time period (e.g., an SAR limit and an MPE limit over a corresponding averaging period). Radios 28 that handle radio-frequency signals at frequencies greater than 6 GHz are sometimes referred to herein as MPE radios 28 because these radios 28 may be subject to MPE limits. Radios 28 that handle radio-frequency signals at frequencies less than 6 GHz are sometimes referred to herein as SAR radios 28 because these radios 28 may be subject to SAR limits. Radios 28 that handle signals greater than 6 GHz and signals less than 6 GHz (e.g., a cellular telephone radio 28) are subject to both SAR and MPE limits and are therefore both a SAR radio and an MPE radio.

Wireless circuitry 24 may include RF exposure metric manager 26 for ensuring that radios 28 comply with these regulatory requirements. The components of RF exposure metric manager 26 may be implemented in hardware (e.g., one or more processors, circuit components, logic gates, diodes, transistors, switches, arithmetic logic units (ALUs), registers, application-specific integrated circuits, field-programmable gate arrays, etc.) and/or software on device 10. RF exposure metric manager 26 may sometimes be referred to herein as RF exposure manager 26, RF exposure managing engine 26, RF exposure metric management circuitry 26, RF exposure metric management engine 26, or RF exposure metric management processor 26. RF exposure metric manager 26 may be coupled to each radio 28 over a respective control path 30 (e.g., control path 30-0 may couple RF exposure metric manager 26 to radio 28-0, control path 30-1 may couple RF exposure metric manager 26 to radio 28-1, control path 30-n may couple RF exposure metric manager 26 to radio 28-n, etc.).

RF exposure metric manager 26 may generate RF exposure budgets BGT for radios 28 (e.g., a first RF exposure budget BGT0 for radio 28-0, a second RF exposure budget BGT1 for radio 28-1, an (n+1)th RF exposure budget BGTn for radio 28-n, etc.). RF exposure metric manager 26 may provide RF exposure budgets BGT to radios 28 over control paths 30. Each RF exposure budget BGT may include a corresponding SAR budget and/or a corresponding MPE budget (e.g., depending on whether the radio subject to that budget is subject to SAR and/or MPE limits). Each RF exposure budget BGT may specify the amount of SAR and/or MPE that may be generated by the corresponding radio 28 in transmitting radio-frequency signals over the regulatory averaging period while still satisfying the overall SAR and MPE regulatory limits. The circuitry in radios 28 may adjust the maximum transmit (TX) power level of its transmitted radio-frequency signals to ensure that the RF exposure budget BGT for that radio remains satisfied over the averaging period (e.g., using look-up tables on the radios that map the RF exposure budget to transmit power levels to use).

In some scenarios, each radio or RAT in device 10 is assigned a fixed SAR/MPE budget, such that the distribution of the total available RF exposure budget across RATs remains static over time to meet the overall SAR/MPE regulatory limits on the operation of device 10 (e.g., over the averaging period). In these scenarios, each radio uses look-up tables to derive the maximum transmit power levels allowed for its fixed SAR/MPE budget and then maintains its transmit power level below that maximum transmit power level to satisfy the SAR/MPE limits. However, assigning static SAR/MPE budgets to the radios in this way without considering the radio needs for the current operating state/environment of device 10 results in sub-optimal budget distribution between the radios/RATs. For example, the part of the overall RF exposure budget that is not used by one radio cannot be re-assigned to another radio that may urgently need to transmit at a higher power level or increased duty cycle.

In order to mitigate these issues, RF exposure metric manager 26 may dynamically allocate SAR and MPE budgets to radios 28 over time (e.g., over the averaging period). RF exposure metric manager 26 may dynamically allocate SAR and MPE budgets to radios 28 based on feedback from radios 28. For example, as shown in FIG. 1, each radio 28 may be coupled to RF exposure metric manager 26 over feedback path 32. Each radio 28 may generate a SAR/MPE report RPT that identifies the amount of the assigned SAR and/or MPE budget that was consumed by that radio during different sub-periods (sometimes referred to herein as instantaneous periods) of the averaging period. SAR/MPE reports RPT may sometimes also be referred to herein as SAR/MPE feedback reports RPT, feedback reports RPT, SAR/MPE feedback RPT, feedback RPT, SAR/MPE feedback signals RPT, or feedback signals RPT. Radios 28 may send the SAR/MPE reports RPT to RF exposure metric manager 26 over feedback path 32 (e.g., radio 28-0 may send SAR/MPE report RPT0 to RF exposure metric manager 26, radio 28-1 may send SAR/MPE report RPT1 to RF exposure metric manager 26, radio 28-n may send SAR/MPE report RPTn to RF exposure metric manager 26, etc.). RF exposure metric manager 26 may receive each SAR/MPE report through the active transmission of the reports by radios 28 (e.g., as control signals or other control data) or by querying or retrieving the reports from radios 28 (e.g., by transmitting control signals or commands to the radios instructing the radios to transmit the corresponding report to RF exposure metric manager 26). RF exposure metric manager 26 may generate updated RF exposure budgets BGT for radios 28 based on the received SAR/MPE reports RPT and based on the current or expected communication needs of device 10 to ensure that radios 28 can continue to transmit radio-frequency signals to meet the active and dynamic needs of device 10 while still satisfying the SAR and MPE limits imposed on device 10 over the averaging period. In this way, RF exposure metric manager 26 may assign SAR/MPE budgets across RATs while ensuring an SAR/MPE compliant overall RF exposure across the RATs.

The example of FIG. 1 is merely illustrative. While control circuitry 14 is shown separately from wireless circuitry 24 in the example of FIG. 1 for the sake of clarity, wireless circuitry 24 may include processing circuitry (e.g., one or more processors) that forms a part of processing circuitry 18 and/or storage circuitry that forms a part of storage circuitry 16 of control circuitry 14 (e.g., portions of control circuitry 14 may be implemented on wireless circuitry 24). As an example, some or all of RF exposure metric manager 26 may form a part of control circuitry 14. In addition, wireless circuitry 24 may include any desired number of antennas 34. Some or all of the antennas 34 in wireless circuitry 24 may be arranged into one or more phased antenna arrays (e.g., for conveying radio-frequency signals over a steerable signal beam). If desired, antenna(s) 34 may be operated using a multiple-input and multiple-output (MIMO) scheme and/or using a carrier aggregation (CA) scheme.

Figure 2:
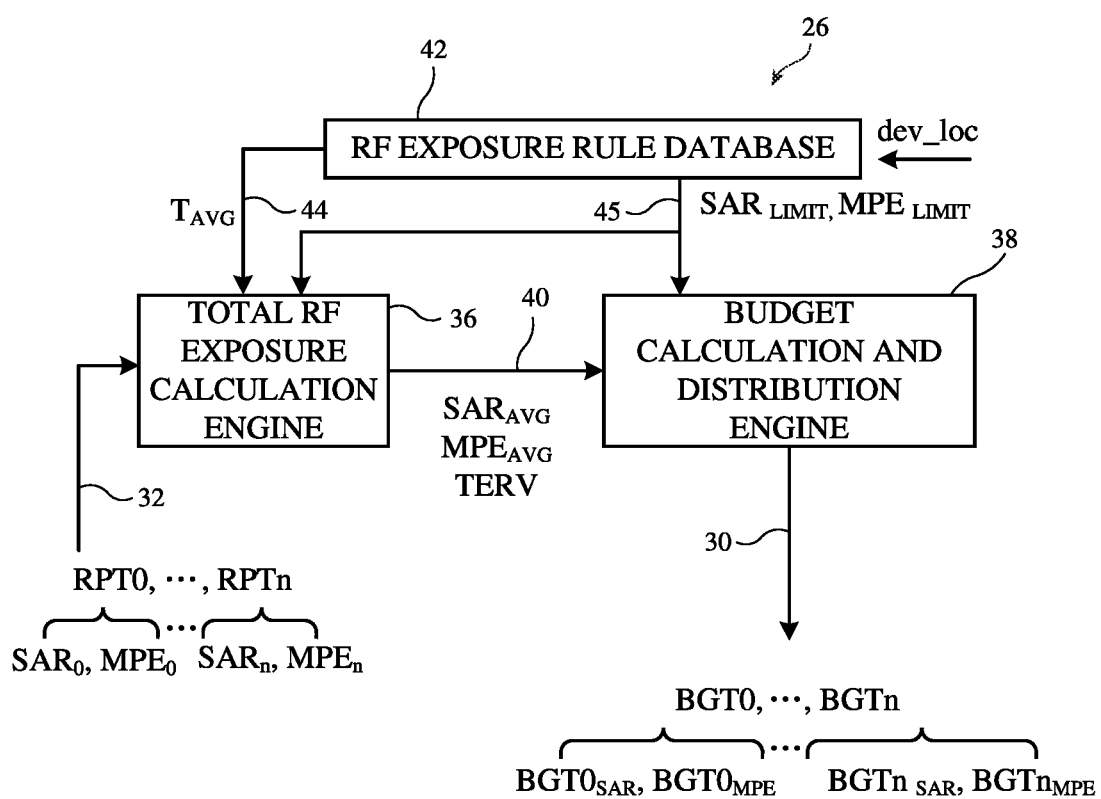
FIG. 2 is a block diagram of an illustrative RF exposure metric manager having a total RF exposure calculation engine and an RF exposure metric budget calculation and distribution engine in accordance with some embodiments.

FIG. 2 is a block diagram of RF exposure metric manager 26 of FIG. 1. As shown in FIG. 2, RF exposure metric manager 26 may include RF exposure rule database 42, total RF exposure calculation engine 36, and budget calculation and distribution engine 38. Total RF exposure calculation engine 36 may sometimes also be referred to herein as total RF exposure calculation circuitry 36, total RF exposure calculation processor 36, or total RF exposure calculator 36. Similarly, budget calculation and distribution engine 38 may sometimes also be referred to herein as budget calculation and distribution circuitry 38, budget calculation and distribution processor 38, or budget calculator and distributor 38. RF exposure rule database 42 may be coupled to total RF exposure calculation engine 36 over control paths 44 and 45 and may be coupled to budget calculation and distribution engine 38 over control path 45.

RF exposure rule database 42 may be hard-coded or soft-coded into RF exposure metric manager 26 (e.g., in storage circuitry 16 of FIG. 1) and may include a database, data table, or any other desired data structure. RF exposure rule database 42 may store RF exposure rules associated with the operation of wireless circuitry 24 within different geographic regions. RF exposure rule database 42 may, for example, store regulatory SAR limits $SAR_{LIMIT}$, regulatory MPE limits $MPE_{LIMIT}$, and averaging periods $T_{AVG}$ for SAR limits $SAR_{LIMIT}$ and MPE limits $MPE_{LIMIT}$ for one or more geographic regions (e.g., countries, continents, states, localities, municipalities, provinces, sovereignties, etc.) that impose regulatory limits on the amount of RF energy exposure permissible for external object 8 within the vicinity of antenna(s) 34. As an example, RF exposure rule database 42 may store a first SAR limit $SAR_{LIMIT}$, a first MPE limit $MPE_{LIMIT}$, and a first averaging period $T_{AVG}$ imposed by the regulatory requirements of a first country, a second SAR limit $SAR_{LIMIT}$, a second MPE limit $MPE_{LIMIT}$, and a second averaging period $T_{AVG}$ imposed by the regulatory requirements of a second country, etc. The entries of RF exposure rule database 42 may be stored upon manufacture, assembly, testing, and/or calibration of device 10 and/or may be updated during the operation of device 10 over time (e.g., periodically or in response to a trigger condition such as a software update or the detection that device 10 has entered a new country for the first time).

Total RF exposure calculation engine 36 may have an input coupled to feedback path 32. Total RF exposure calculation engine 36 may have an output coupled to budget calculation and distribution engine 38 over path 40. Total RF exposure calculation engine 36 may receive SAR/MPE reports RPT from radios 28 over feedback path 32. Each SAR/MPE report RPT may include a corresponding SAR report and/or a corresponding MPE report. For example, the SAR/MPE report RPT0 produced by radio 28-0 of FIG. 1 may include a first SAR report $SAR_0$ and a first MPE report $MPE_0$, the SAR/MPE report RPT1 produced by radio 28-1 may include a second SAR report $SAR_1$ and a second MPE report $MPE_1$, the SAR/MPE report RPTn produced by radio 28-$n$ may include an (n+1)th SAR report $SAR_n$ and an (n+1)th MPE report $MPE_n$, etc. For radios 28 that do not operate at frequencies greater than 6 GHz (e.g., SAR radios 28), the MPE report generated by that radio may be null or empty or that radio 28 may omit an MPE report from its SAR/MPE report RPT. Similarly, for radios 28 that do not operate at frequencies less than 6 GHz (e.g., MPE radios 28), the SAR report generated by that radio may be null or empty or that radio 28 may omit a SAR report from its SAR/MPE report RPT.

Total RF exposure calculation engine 36 may generate (e.g., compute, calculate, identify, produce, etc.) an average consumed SAR value $SAR_{AVG}$, an average consumed MPE value $MP_{AVG}$, and a consumed total exposure ratio value TERV based on the SAR/MPE reports RPT received over feedback path 32, the averaging period $T_{AVG}$ received from RF exposure rule database 42 over control path 44, and the SAR limit $SAR_{LIMIT}$ and the MPE limit $MPE_{LIMIT}$ received from RF exposure rule database 42 over control path 45. RF exposure rule database 42 may identify a particular averaging period $T_{AVG}$, a particular SAR limit $SAR_{LIMIT}$, and a particular MPE limit $MPE_{LIMIT}$ to send to total RF exposure calculation engine 36 based on the current geographic location of device 10.

Total RF exposure rule database 42 may, for example, receive a control signal dev_loc (e.g., from other portions of control circuitry 14 of FIG. 1) that identifies the current location of device 10. Total RF exposure rule database 42 may use control signal dev_loc to identify the averaging period $T_{AVG}$, SAR limit $SAR_{LIMIT}$, and MPE limit $MPE_{LIMIT}$, imposed by the corresponding regulatory body for the current location of device 10, and may provide the identified $T_{AVG}$, $SAR_{LIMIT}$, and $MPE_{LIMIT}$ values to total RF exposure calculation engine 36 to use in generating values $SAR_{AVG}$, $MPE_{AVG}$, and TERV. Control circuitry 14 (FIG. 1) may generate control signal dev_loc based on the current GPS location of device 10, sensor data such as compass or accelerometer data, a location of device 10 as identified by a base station or access point in communication with device 10, and/or any other desired information indicative of the geographic location of device 10.

Total RF exposure calculation engine 36 may generate average SAR value $SAR_{AVG}$ based on the SAR reports in the SAR/MPE reports RPT received over feedback path 32.

Average SAR value $SAR_{AVG}$ may be indicative of the average amount of the current SAR budgets consumed by all of the radios 28 in wireless circuitry 24 during the current averaging period $T_{AVG}$. Similarly, total RF exposure calculation engine 36 may generate average MPE value $MPE_{AVG}$ based on the MPE reports in the SAR/MPE reports RPT received over feedback path 32. Average MPE value $MPE_{AVG}$ may be indicative of the average amount of the current MPE budgets consumed by all of the radios 28 in wireless circuitry 24 during the current averaging period $T_{AVG}$. Total exposure ratio value TERV may be indicative of the combined SAR and MPE consumption by all of the radios 28 in wireless circuitry 24 during the current averaging period $T_{AVG}$.

Budget calculation and distribution engine 38 may generate updated RF exposure budgets BGT for each radio 28 in wireless circuitry 24 based on the average SAR value $SAR_{AVG}$ received over path 40, the average MPE value $MPE_{AVG}$ received over path 40, the total exposure ratio value TERV received over path 40, the SAR limit $SAR_{LIMIT}$ received over path 45, and the MPE limit $MPE_{LIMIT}$ received over path 45. Budget calculation and distribution engine 38 may also generate the updated RF exposure budgets BGT while taking into account which radios may or may not need to perform more or less transmission at any given time. The updated RF exposure budgets BGT may serve to dynamically adjust the amount of SAR/MPE budget provided to each radio within the current averaging period $T_{AVG}$ and/or across multiple averaging periods $T_{AVG}$.

Budget calculation and distribution engine 38 may provide each RF exposure budget BGT to the corresponding radio 28 to be subjected to that RF exposure budget over control paths 30. Each RF exposure budget BGT may include a corresponding SAR budget and/or a corresponding MPE budget. For example, the RF exposure budget BGT0 provided to radio 28-0 of FIG. 1 may include a first SAR budget $BGT0_{SAR}$ and a first MPE budget $BGT0_{MPE}$, the RF exposure budget BGT1 provided to radio 28-1 may include a second SAR budget $BGT1_{SAR}$ and a second MPE budget $BGT1_{MPE}$, the RF exposure budget BGTn provided to radio 28-$n$ may include an (n+1)th SAR budget $BGTn_{SAR}$ and an (n+1)th MPE budget $BGTn_{MPE}$, etc. For radios 28 that do not operate at frequencies greater than 6 GHz (e.g., SAR radios 28), the MPE budget generated for that radio may be null or empty or budget calculation and distribution engine 38 may omit an MPE budget from the RF exposure budget for that radio. Similarly, for radios 28 that do not operate at frequencies less than 6 GHz (e.g., MPE radios 28), the SAR budget generated for that radio may be null or empty or budget calculation and distribution engine 38 may omit an SAR budget from the RF exposure budget for that radio.

Radios 28 may use the updated RF exposure budgets produced by budget calculation and distribution engine 38 to transmit radio-frequency signals. The radios may produce SAR/MPE reports RPT associated with the transmission of radio-frequency signals using the updated RF exposure budgets. This process may iterate to continue to update the RF exposure budgets provided to each radio over time, thereby allowing RF exposure metric manager 26 to dynamically adjust the amount of SAR and MPE budget provided to each radio based on feedback from previous transmissions by the radio, the SAR and MPE limits imposed by the corresponding regulatory body, and the current or future communications needs of device 10.

Figure 3:
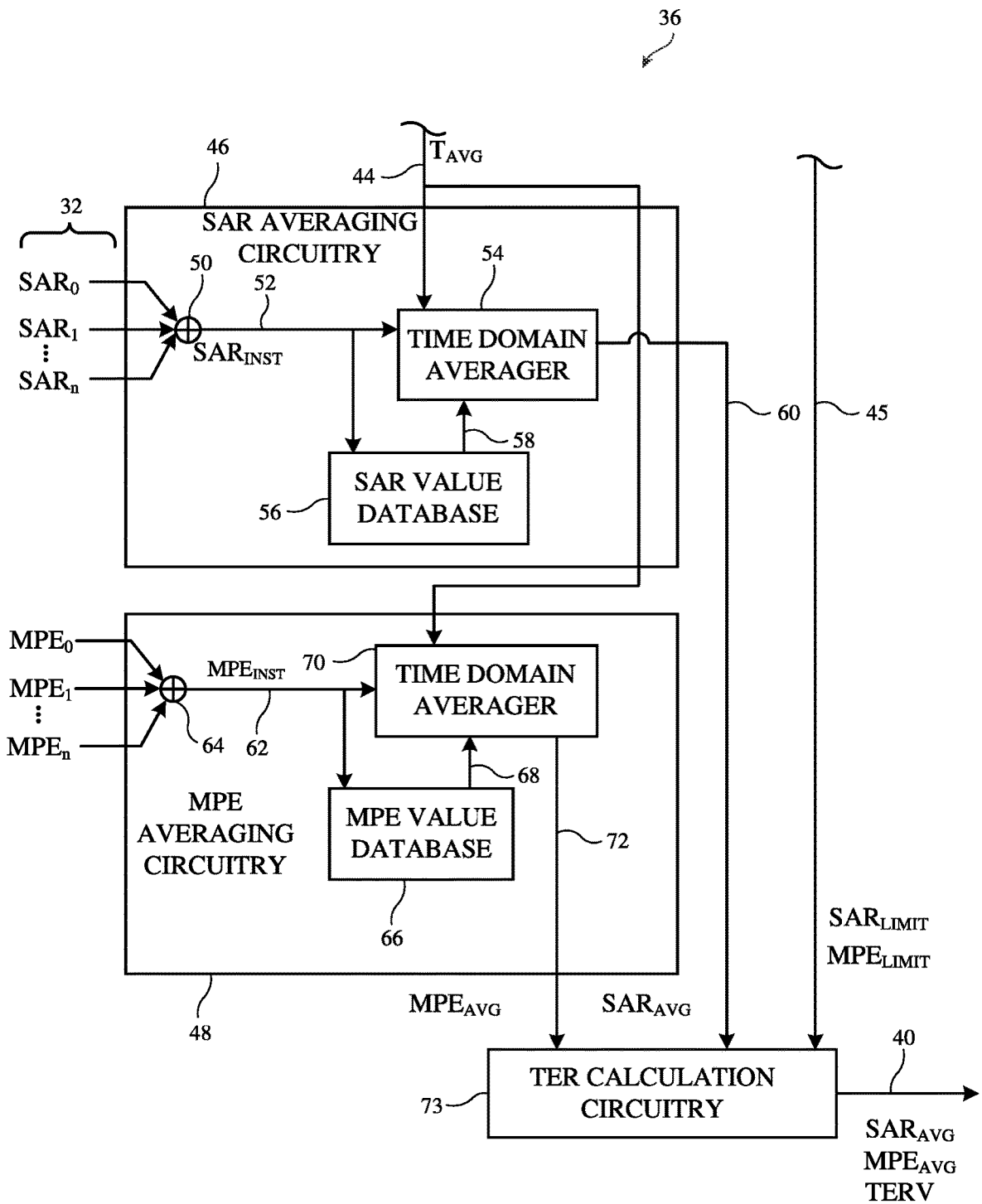
FIG. 3 is a circuit block diagram of an illustrative total RF exposure calculation engine in accordance with some embodiments.

FIG. 3 is a circuit block diagram of total RF exposure calculation engine 36 of FIG. 2. As shown in FIG. 3, total RF exposure calculation engine 36 may include SAR averaging circuitry 46, MPE averaging circuitry 48, and TER calculation circuitry 73. SAR averaging circuitry 46 may sometimes also be referred to herein as SAR averager 46 or SAR averaging engine 46. MPE averaging circuitry 48 may sometimes also be referred to herein as MPE averager 48 or MPE averaging engine 48. TER calculation circuitry 73 may sometimes also be referred to herein as TER calculation engine 73 or TER calculator 73. The components of SAR averaging circuitry 46, MPE averaging circuitry 48, and TER calculation circuitry 73 may be implemented in hardware (e.g., one or more processors, circuit components, logic gates, diodes, transistors, switches, arithmetic logic units (ALUs), registers, application-specific integrated circuits, field-programmable gate arrays, etc.) and/or software on device 10.

MPE averaging circuitry 48 and SAR averaging circuitry 46 may be coupled in parallel between feedback path 32 and TER calculation circuitry 73. TER calculation circuitry 73 may be coupled in series between MPE averaging circuitry 48 and path 40. TER calculation circuitry 73 may also be coupled in series between SAR averaging circuitry 46 and path 40. SAR averaging circuitry 46 may include addition logic such as adder 50, time domain averaging circuitry such as time domain averager 54, and a SAR value database such as SAR value database 56. The output of adder 50 may be coupled to the input of time domain averager 54 and SAR value database 56 over path 52. SAR value database 56 may also be coupled to time domain averager 54 over path 58.

Similarly, MPE averaging circuitry 48 may include addition logic such as adder 64, time domain averaging circuitry such as time domain averager 70, and an MPE value database such as MPE value database 66. The output of adder 64 may be coupled to the input of time domain averager 70 and MPE value database 66 over path 62. MPE value database 66 may also be coupled to time domain averager 54 over path 68. SAR value database 56 and MPE value database 66 may be databases, data tables, or any other desired data structures (e.g., on storage circuitry 16 of FIG. 1). While shown in FIG. 3 as separate databases, SAR value database 56 and MPE value database 66 may be formed from respective portions of the same database or data structure if desired.

Time domain averager 54 and time domain averager 70 may each receive averaging period $T_{AVG}$ from RF exposure rule database 42 (FIG. 2) over control path 44. The output of time domain averager 54 may be coupled to a first input of TER calculation circuitry 73 over path 60. The output of time domain averager 70 may be coupled to a second input of TER calculation circuitry 73 over path 72. TER calculation circuitry 73 may also have a third input coupled to RF exposure rule database 42 over control path 45. The input of adder 50 and the input of adder 64 may be coupled to feedback path 32.

Averaging period $T_{AVG}$ is determined by the regulatory body governing the current location of device 10 and is stored in RF exposure rule database 42 of FIG. 2. The regulatory body may, for example, allow the SAR or MPE of device 10 to temporarily or instantaneously exceed SAR limit $SAR_{LIMIT}$ or MPE limit $MPE_{LIMIT}$, so long as the average SAR and MPE of device 10 does not to exceed SAR limit $SAR_{LIMIT}$ or MPE limit $MPE_{LIMIT}$ over averaging period $T_{AVG}$. Averaging period $T_{AVG}$ may be, for example, between 1 and 60 seconds (e.g., 1 seconds, 4 seconds, 10 seconds, 30 seconds, 60 seconds, etc.). Averaging period $T_{AVG}$ may also sometimes be referred to herein as averaging window $T_{AVG}$.

Averaging period $T_{AVG}$ may be divided into a series of instantaneous periods (sometimes referred to herein as sub-windows or subperiods of averaging period $T_{AVG}$). While referred to herein as "instantaneous" periods, the instantaneous periods have a finite duration that is less than the duration of averaging period $T_{AVG}$. Each instantaneous period may be, for example, 1 second, between 1 and 10 seconds, 100 ms, between 100 ms and 10 seconds, between 100 ms and 1 second, less than 100 ms, 10 ms, between 1 and 100 ms, etc. The duration of the instantaneous period may be configurable (adjustable) if desired. For example, RF exposure metric manager 26 may adjust the duration of the instantaneous period to scale according to the applicable use case.

Adder 50 in SAR averaging circuitry 46 may receive, over feedback path 32, the SAR reports $SAR_0$, $SAR_1$, ..., $SAR_n$ in the SAR/MPE reports RPT produced by radios 28. SAR reports $SAR_0$, $SAR_1$, ..., $SAR_n$ may be generated during the immediately previous instantaneous period of averaging period $T_{AVG}$ (e.g., each SAR report may be indicative of the amount of SAR consumed by the corresponding radio during the previous instantaneous period of averaging period $T_{AVG}$). Adder 50 may add SAR reports $SAR_0$, $SAR_1$, ..., $SAR_n$ together to produce an instantaneous SAR value $SAR_{INST}$. Instantaneous SAR value $SAR_{INST}$ (in units of W/kg) may correspond to the overall SAR consumed by all radios 28 while transmitting radio-frequency signals during the current instantaneous period.

Adder 50 may pass instantaneous SAR value $SAR_{INST}$ to time domain averager 54 and SAR value database 56 over path 52. SAR value database 56 may store instantaneous SAR value $SAR_{INST}$ for future processing. SAR value database 56 may store the instantaneous SAR values $SAR_{INST}$ produced during all of the previous instantaneous periods in the current averaging period $T_{AVG}$ and may, if desired, store instantaneous SAR values $SAR_{INST}$ from previous averaging periods $T_{AVG}$. SAR value database 56 may provide each of the instantaneous SAR values $SAR_{INST}$ produced during previous instantaneous periods of the current averaging period $T_{AVG}$ to time domain averager 54 over path 58.

Time domain averager 54 may generate (e.g., compute, calculate, identify, produce, etc.) average SAR value $SAR_{AVG}$ based on the instantaneous SAR value $SAR_{INST}$ generated by adder 50 for the current instantaneous period, each instantaneous SAR value $SAR_{INST}$ generated for all previous instantaneous periods of the current averaging period $T_{AVG}$ (e.g., as provided by SAR value database 56), and the duration of averaging period $T_{AVG}$ (e.g., by averaging the instantaneous SAR values $SAR_{INST}$ in the time domain over averaging period $T_{AVG}$). In other words, time domain averager 54 may generate average SAR value $SAR_{AVG}$ according to equation 1.

$$SAR_{AVG} = \frac{\sum_{i=0}^{i=x} SAR_{INST}}{T_{AVG}} \quad (1)$$

In equation 1, "i" is an index value and x is the number of samples applied for averaging (e.g., the number of instantaneous periods), which may depend on the sampling rate and the duration of the averaging period. Time domain averager 54 may pass average SAR value $SAR_{AVG}$ to TER calculation circuitry 73 over path 60.

At the same time, adder 64 in MPE averaging circuitry 48 may receive, over feedback path 32, the MPE reports $MPE_0$, $MPE_1$, ..., $MPE_n$ in the SAR/MPE reports RPT produced by radios 28. MPE reports $MPE_0$, $MPE_1$, ..., $MPE_n$ may be generated during the immediately previous instantaneous period of averaging period $T_{AVG}$ (e.g., each MPE report may be indicative of the amount of MPE consumed by the corresponding radio during the previous instantaneous period of averaging period $T_{AVG}$). Adder 64 may add MPE reports $MPE_0$, $MPE_1$, ..., $MPE_n$ together to produce an instantaneous MPE value $MPE_{INST}$. Instantaneous MPE value $MPE_{INST}$ (in units of $mW/cm^2$) may correspond to the overall MPE produced by all radios 28 while transmitting radio-frequency signals during the current instantaneous period.

Adder 64 may pass instantaneous MPE value $MPE_{INST}$ to time domain averager 70 and MPE value database 66 over path 62. MPE value database 66 may store instantaneous MPE value $MPE_{INST}$ for future processing. MPE value database 66 may store the instantaneous MPE values $MPE_{INST}$ produced during all of the previous instantaneous periods in the current averaging period $T_{AVG}$ and may, if desired, store instantaneous MPE values $MPE_{INST}$ from previous averaging periods $T_{AVG}$. MPE value database 66 may provide each of the instantaneous MPE values $MPE_{INST}$ produced during previous instantaneous periods of the current averaging period $T_{AVG}$ to time domain averager 70 over path 68.

Time domain averager 70 may generate (e.g., compute, calculate, identify, produce, etc.) average MPE value $MPE_{AVG}$ based on the instantaneous MPE value $MPE_{INST}$ generated by adder 64 for the current instantaneous period, each instantaneous MPE value $MPE_{INST}$ generated for all previous instantaneous periods of the current averaging period $T_{AVG}$ (e.g., as provided by MPE value database 66), and the duration of averaging period $T_{AVG}$ (e.g., by averaging the instantaneous MPE values $MPE_{INST}$ in the time domain over averaging period $T_{AVG}$). In other words, time domain averager 70 may generate average MPE value $MPE_{AVG}$ according to equation 2.

$$MPE_{AVG} = \frac{\sum_{k=0}^{i=x} MPE_{INST}}{T_{AVG}} \quad (2)$$

Time domain averager 70 may pass average MPE value $MPE_{AVG}$ to TER calculation circuitry 73 over path 72. MPE averaging circuitry 48 may generate average MPE value $MPE_{AVG}$ and SAR averaging circuitry 46 may generate average SAR value $SAR_{AVG}$ in parallel (e.g., concurrently or simultaneously).

TER calculation circuitry 73 may generate (e.g., compute, calculate, identify, produce, etc.) total exposure ratio value TERV based on the SAR limit $SAR_{LIMIT}$ and the MPE limit $MPE_{LIMIT}$ received over control path 45 (e.g., the SAR limit and MPE limit corresponding to averaging period $T_{AVG}$ as dictated by the regulatory body of the geographic region in which device 10 is located), the average MPE value $MPE_{AVG}$ received over path 72, and the average SAR value $SAR_{AVG}$ received over path 60. TER calculation circuitry 73 may, for example, generate total exposure ratio value TERV according to equation 3.

$$TERV = \frac{SAR_{AVG}}{SAR_{LIMIT}} + \frac{MPE_{AVG}}{MPE_{LIMIT}} \quad (3)$$

TER calculation circuitry 50 may, for example, include one or more adders and one or more dividers for generating total exposure ratio value TERV. TER calculation circuitry 73 may pass average MPE value $MPE_{AVG}$, average SAR value $SAR_{AVG}$, and total exposure ratio value TERV to budget calculation and distribution engine 38 (FIG. 2) over path 40 for further processing. Total RF exposure calculation engine 36 may continue to generate $SAR_{AVG}$, $MPE_{AVG}$, and TERV values for each instantaneous period of averaging period $T_{AVG}$ and during subsequent averaging periods $T_{AVG}$.

Figure 4:
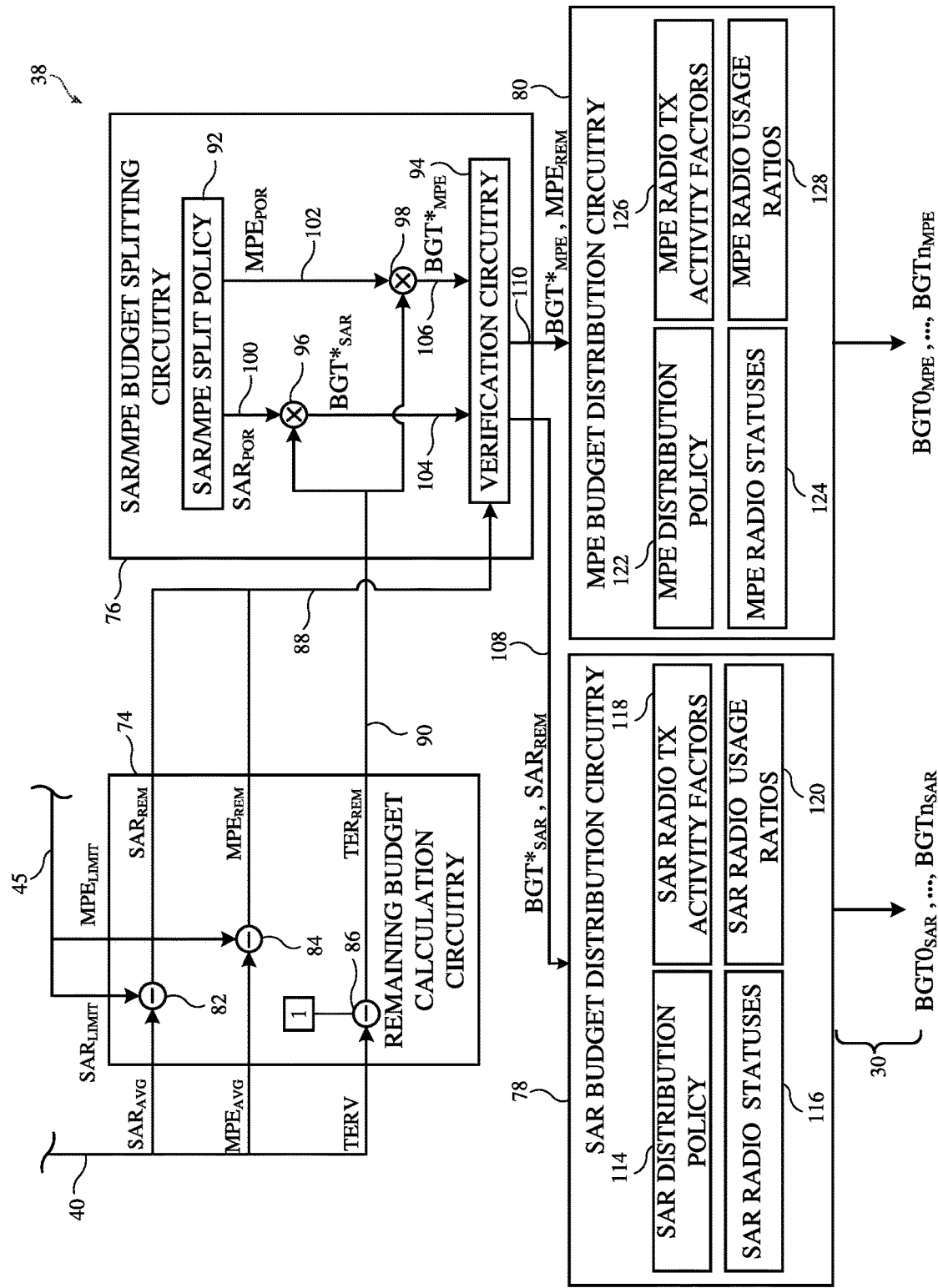
FIG. 4 is a circuit block diagram of an illustrative RF exposure metric budget calculation and distribution engine in accordance with some embodiments.

FIG. 4 is a circuit block diagram of budget calculation and distribution engine 38 of FIG. 2. As shown in FIG. 4, budget calculation and distribution engine 38 may include remaining budget calculation circuitry 74, SAR/MPE budget splitting circuitry 76, SAR budget distribution circuitry 78, and MPE budget distribution circuitry 80. Remaining budget calculation circuitry 74 may sometimes also be referred to herein as remaining budget calculation engine 74 or remaining budget calculator 74. SAR/MPE budget splitting circuitry 76 may sometimes also be referred to herein as SAR/MPE budget splitting engine 76 or SAR/MPE budget splitter 76. SAR budget distribution circuitry 78 may sometimes also be referred to herein as SAR budget distribution engine 78 or SAR budget distributor 78. MPE budget distribution circuitry 80 may sometimes also be referred to herein as MPE budget distribution engine 80 or MPE budget distributor 80. The components of remaining budget calculation circuitry 74, SAR/MPE budget splitting circuitry 76, SAR budget distribution circuitry 78, and MPE budget distribution circuitry 80 may be implemented in hardware (e.g., one or more processors, circuit components, logic gates, diodes, transistors, switches, arithmetic logic units (ALUs), registers, application-specific integrated circuits, field-programmable gate arrays, etc.) and/or software on device 10.

Remaining budget calculation circuitry 74 may have a first input coupled to path 40 and a second input coupled to control path 45. The output of remaining budget calculation circuitry 74 may be coupled to the input of SAR/MPE budget splitting circuitry 76 over paths 88 and 90. The output of SAR/MPE budget splitting circuitry 76 may be coupled to the input of SAR budget distribution circuitry 78 over path 108 and to the input of MPE budget distribution circuitry 80 over path 110. The outputs of SAR budget distribution circuitry 78 and MPE budget distribution circuitry 80 may be coupled to radios 28 (FIG. 1) over control paths 30. In other words, remaining budget calculation circuitry 74 may be coupled in series between path 40 and SAR/MPE budget splitting circuitry 76. SAR/MPE budget splitting circuitry 76 may be coupled in series between remaining budget calculation circuitry 74 and SAR budget distribution circuitry 78. SAR/MPE budget splitting circuitry 76 may also be coupled in series between remaining budget calculation circuitry 74 and MPE budget distribution circuitry 80. SAR budget distribution circuitry 78 and MPE budget distribution circuitry 80 may be coupled in parallel between SAR/MPE budget splitting circuitry 76 and control paths 30 (radios 28).

Remaining budget calculation circuitry 74 may include subtraction logic such as a first subtractor 82, a second subtractor 84, and a third subtractor 86. Subtractors 82, 84, and 86 may sometimes also be referred to herein as subtraction circuits and may include logic gates (e.g., AND gates, XOR gates, etc.), inverters, and/or other components for outputting the difference between first and second inputs. Subtractors 82, 84, and 86 may be coupled in parallel between path 40 and SAR/MPE budget splitting circuitry 76. Subtractor 82 may have a first input coupled to path 40, a second input coupled to control path 45, and an output coupled to SAR/MPE budget splitting circuitry 76 over path 88. Subtractor 82 may receive SAR limit $SAR_{LIMIT}$ from RF exposure rule database 42 (FIG. 2) over control path 45. Subtractor 82 may receive average SAR value $SAR_{AVG}$ over path 40. Subtractor 84 may also have a first input coupled to path 40, a second input coupled to control path 45, and an output coupled to SAR/MPE budget splitting circuitry 76 over path 88. Subtractor 84 may receive MPE limit $MPE_{LIMIT}$ from RF exposure rule database 42 (FIG. 2) over control path 45. Subtractor 84 may receive average MPE value $MPE_{AVG}$ over path 40. Subtractor 86 may have a first input coupled to path 40, a second input that receives the integer 1, and an output coupled to SAR/MPE budget splitting circuitry 76 over path 90.

Subtractor 82 may generate (e.g., calculate, compute, identify, produce, etc.) a remaining SAR value $SAR_{REM}$ on path 88 by subtracting average SAR value $SAR_{AVG}$ from SAR limit $SAR_{LIMIT}$. Remaining SAR value $SAR_{REM}$ may correspond to the amount of unused SAR budget that has not yet been consumed by radios 28 during the current averaging period $T_{AVG}$. Similarly, subtractor 84 may generate (e.g., calculate, compute, identify, produce, etc.) a remaining MPE value $MPE_{REM}$ on path 88 by subtracting average MPE value $MPE_{AVG}$ from MPE limit $MPE_{LIMIT}$. Remaining MPE value $MPE_{REM}$ may correspond to the amount of unused MPE budget has not yet been consumed by radios 28 during the current averaging period $T_{AVG}$. Subtractor 86 may generate (e.g., calculate, compute, identify, produce, etc.) a remaining total exposure ratio value $TER_{REM}$ on path 90 by subtracting total exposure ratio value TER from the integer 1. Remaining total exposure ratio value $TER_{REM}$ may correspond to the amount of unused total exposure ratio consumed by radios 28 during the current averaging period $T_{AVG}$.

SAR/MPE budget splitting circuitry 76 may include an SAR/MPE split policy 92, verification circuitry 94 and multiplication logic such as multipliers 96 and 98

Multiplier 96 may have a first input that receives remaining TER value $TER_{REM}$ over path 90, a second input that receives an SAR allocation $SAR_{POR}$ from SAR/MPE split policy 92 (over path 100), and an output coupled to verification circuitry 94 over path 104. Multiplier 98 may have a first input that receives remaining TER value $TER_{REM}$ over path 90, a second input that receives an MPE allocation $MPE_{POR}$ from SAR/MPE split policy 92 (over path 102), and an output coupled to verification circuitry 94 over path 106. SAR/MPE split policy 92 may be predetermined for device 10 or produced by RF exposure metric manager 26 (FIG. 1) and may dictate how much RF exposure budget should be allocated to the SAR radios 28 relative to the MPE radios 28. SAR/MPE split policy 92 may depend on which radios 28 are needed for transmitting and/or receiving desired data for applications running on device 10. SAR/MPE split policy 92 may, for example, be an initial assumption of the amount of SAR or MPE budget needed by each radio, which may be defined for device 10 during manufacture, assembly, testing, or calibration. For example, radios such as radios operating under a cellular RAT may be assumed to need more SAR and/or more MPE budget than other radios such as a Bluetooth radio, which does not need any MPE budget. SAR allocation $SAR_{POR}$ may form a weighting factor indicative of the amount of the RF exposure budget that is to be allocated to SAR radios 28 and MPE allocation $MPE_{POR}$ may form a weighting factor indicative of the amount of RF exposure budget that is to be allocated to MPE radios 28. SAR allocation $SAR_{POR}$ and MPE allocation $MPE_{POR}$ may help to ensure that each radio 28 receives a desired minimum amount of exposure budget to begin transmission.

Multiplier 96 may generate (e.g., calculate, compute, identify, produce, etc.) an updated overall SAR budget $BGT^*_{SAR}$ by multiplying remaining TER value $TER_{REM}$ by SAR allocation $SAR_{POR}$. Multiplier 96 may pass overall SAR budget $BGT^*_{SAR}$ to verification circuitry 94 over path 104. Multiplier 98 may generate (e.g., calculate, compute, identify, produce, etc.) an updated overall MPE budget $BGT^*_{MPE}$ by multiplying remaining TER value $TER_{REM}$ by MPE allocation $MPE_{POR}$. Multiplier 98 may pass overall MPE budget $BGT^*_{MPE}$ to verification circuitry 94 over path 104.

Verification circuitry 94 may receive remaining SAR value $SAR_{REM}$ and remaining MPE value $MPE_{REM}$ over path 88. Verification circuitry 94 may determine whether overall SAR budget $BGT^*_{SAR}$ exceeds remaining SAR value $SAR_{REM}$. Verification circuitry 94 may include one or more comparators, for example. If overall SAR budget $BGT^*_{SAR}$ does not exceed remaining SAR value $SAR_{REM}$, verification circuitry 94 may transmit overall SAR budget $BGT^*_{SAR}$ to SAR budget distribution circuitry 78 over path 108 and SAR budget distribution circuitry 78 may distribute (divide) overall SAR budget $BGT^*_{SAR}$ across radios 28 (e.g., as SAR budgets $BGT0_{SAR}, \ldots, BGTn_{SAR}$). If overall SAR budget $BGT^*_{SAR}$ exceeds remaining SAR value $SAR_{REM}$, verification circuitry 94 may replace overall SAR budget $BGT^*_{SAR}$ with remaining SAR value $SAR_{REM}$ and may transmit remaining SAR value $SAR_{REM}$ to SAR budget distribution circuitry 78 over path 108 for distribution across radios 28 (e.g., as SAR budgets $BGT0_{SAR}, \ldots, BGTn_{SAR}$).

Similarly, verification circuitry 94 may determine whether overall MPE budget $BGT^*_{MPE}$ exceeds remaining MPE value $MPE_{REM}$. If overall MPE budget $BGT^*_{MPE}$ does not exceed remaining MPE value $MPE_{REM}$, verification circuitry 94 may transmit overall MPE budget $BGT^*_{MPE}$ to MPE budget distribution circuitry 80 over path 110 and MPE budget distribution circuitry 80 may distribute (divide) overall MPE budget $BGT^*_{MPE}$ across radios 28 (e.g., as MPE budgets $BGT0_{MPE}, \ldots, BGTn_{MPE}$). If overall MPE budget $BGT^*_{MPE}$ exceeds remaining MPE value $MPE_{REM}$, verification circuitry 94 may replace overall MPE budget $BGT^*_{MPE}$ with remaining MPE value $MPE_{REM}$ and may transmit remaining MPE value $MPE_{REM}$ to MPE budget distribution circuitry 80 over path 110 for distribution across radios 28 (e.g., as MPE budgets $BGT0_{MPE}, \ldots, BGTn_{MPE}$).

SAR budget distribution circuitry 78 may track and store information related to the activity and operation of each of the SAR radios 28 in wireless circuitry 24. For example, SAR budget distribution circuitry 78 may store information identifying a SAR distribution policy such as SAR distribution policy 114, SAR radio transmit (TX) activity factors such as SAR radio TX factors 118, SAR radio statuses such as SAR radio statuses 116, and SAR radio usage ratios such as SAR radio usage ratios 120. SAR distribution policy 114, SAR radio TX activity factors 118, SAR radio statuses 116, and SAR radio usage ratios 120 may be stored on storage circuitry 16 of FIG. 1, for example. SAR budget distribution circuitry 78 may update SAR distribution policy 114, SAR radio TX activity factors 118, SAR radio statuses 116, and/or SAR radio usage ratios 120 over time (e.g., as the operating conditions, operating environment, software application needs, and/or communications needs of device 10 change over time). As an example, information for SAR distribution policy 114, SAR radio TX activity factors 118, SAR radio statuses 116, and/or SAR radio usage ratios 120 may be provided to SAR budget distribution circuitry 78 in the feedback reports RPT produced by radios 28 and/or by software applications running on device 10.

SAR budget distribution circuitry 78 may distribute the overall SAR budget $BGT^*_{SAR}$ received from SAR/MPE budget splitting circuitry 76 between SAR radios 28 according to (based on) SAR distribution policy 114, SAR radio TX activity factors 118, SAR radio statuses 116, and/or SAR radio usage ratios 120. In other words, SAR budget distribution circuitry 78 may distribute overall SAR budget $BGT^*_{SAR}$ across/between the SAR budgets $BGT0_{SAR}, \ldots, BGTn_{SAR}$ provided to radios 28 such that some of the SAR budgets $BGT0_{SAR}, \ldots, BGTn_{SAR}$ are allocated more of the overall SAR budget $BGT^*_{SAR}$ than others (or such that each radio receives the same SAR budget). For the current instantaneous period, the SAR budget allocated to any given SAR radio 28 may be different than the SAR budget allocated to that same SAR radio 28 during the previous instantaneous period (e.g., because RF exposure metric manager 26 dynamically adjusts the SAR budget based on the feedback reports RPT generated by radios 28 during previous instantaneous periods and based on SAR distribution policy 114, SAR radio TX activity factors 118, SAR radio statuses 116, and SAR radio usage ratios 120). In scenarios where SAR/MPE budget splitting circuitry 76 provides remaining SAR value $SAR_{REM}$ to SAR budget distribution circuitry 78, SAR budget distribution circuitry 78 may distribute the remaining SAR value $SAR_{REM}$ between the SAR budgets $BGT0_{SAR}$, ..., $BGTn_{SAR}$ provided to radios 28 (e.g., based on SAR distribution policy 114, SAR radio TX activity factors 118, SAR radio statuses 116, and/or SAR radio usage ratios 120).

SAR distribution policy 114 may identify which SAR radios 28 require SAR budget at a current point in time (e.g., because the radios already have a wireless connection established with external communication equipment). The SAR radios 28 that are actively communicating with external communications equipment and conveying a relatively large amount of data may, for example, require more SAR budget and may be allocated more SAR budget than the SAR radios 28 that are not actively communicating with the external communications equipment or that are conveying a relatively low amount of data. SAR radio statuses 116 may identify which SAR radios 28 are active or in an idle or sleep mode at any given time. SAR radios 28 that are active may, for example, require more SAR budget than SAR radios that are idle, inactive, or asleep. SAR radio TX activity factors 118 may identify the amount of transmit activity being used or expected to be used by each SAR radio 28. SAR radios 28 that have a high amount of actual or expected transmit activity may, for example, require more SAR budget than SAR radios that have a relatively small amount of actual or expected transmit activity. SAR radio usage ratios 120 may identify how much of past SAR budgets was actually used by each SAR radio 28. A SAR radio 28 that used all or most of its allocated SAR budget during one or more of the previous instantaneous periods and/or averaging periods may, for example, require more SAR budget during the next instantaneous period than SAR radios 28 that used relatively little of its SAR budget during the previous instantaneous periods.

Once SAR budget distribution circuitry 78 has generated (e.g., calculated, allocated, distributed, computed produced, etc.) SAR budgets $BGT0_{SAR}$, ..., $BGTn_{SAR}$, SAR budget distribution circuitry 78 may transmit SAR budgets $BGT0_{SAR}$, ..., $BGTn_{SAR}$ to radios 28 over control paths 30. Radios 28 may then transmit radio-frequency signals during a subsequent instantaneous period in accordance with its SAR budget as allocated/distributed by SAR budget distribution circuitry 78.

Similarly, MPE budget distribution circuitry 80 may track and store information related to the activity and operation of each of the MPE radios 28 in wireless circuitry 24. For example, MPE budget distribution circuitry 80 may store information identifying a MPE distribution policy such as MPE distribution policy 122, MPE radio transmit (TX) activity factors such as MPE radio TX factors 126, MPE radio statuses such as MPE radio statuses 124, and MPE radio usage ratios such as MPE radio usage ratios 128. MPE distribution policy 122, MPE radio TX activity factors 126, MPE radio statuses 124, and MPE radio usage ratios 128 may be stored on storage circuitry 16 of FIG. 1, for example. MPE budget distribution circuitry 80 may update MPE distribution policy 122, MPE radio TX activity factors 126, MPE radio statuses 124, and/or MPE radio usage ratios 128 over time (e.g., as the operating conditions, operating environment, software application needs, and/or communications needs of device 10 change over time). As an example, information for MPE distribution policy 122, MPE radio TX activity factors 126, MPE radio statuses 124, and/or MPE radio usage ratios 128 may be provided to MPE budget distribution circuitry 80 in the feedback reports RPT produced by radios 28 and/or by software applications running on device 10.

MPE budget distribution circuitry 80 may distribute the overall MPE budget $BGT^*_{MPE}$ received from SAR/MPE budget splitting circuitry 76 between MPE radios 28 according to (based on) MPE distribution policy 122, MPE radio TX activity factors 126, MPE radio statuses 124, and/or MPE radio usage ratios 128. In other words, MPE budget distribution circuitry 80 may distribute overall MPE budget $BGT^*_{MPE}$ across/between the MPE budgets $BGT0_{MPE}$, ..., $BGTn_{MPE}$ provided to radios 28 such that some of the MPE budgets $BGT0_{MPE}$, ..., $BGTn_{MPE}$ are allocated more of the overall MPE budget $BGT^*_{MPE}$ than others (or such that each radio 28 is allocated the same MPE budget). For the current instantaneous period, the MPE budget allocated to any given MPE radio 28 may be different than the MPE budget allocated to that same MPE radio 28 during the previous instantaneous period (e.g., because RF exposure metric manager 26 dynamically adjusts the MPE budget based on the feedback reports RPT generated by radios 28 during previous instantaneous periods and based on MPE distribution policy 122, MPE radio TX activity factors 126, MPE radio statuses 124, and MPE radio usage ratios 128). In scenarios where SAR/MPE budget splitting circuitry 76 provides remaining MPE value $MPE_{REM}$ to MPE budget distribution circuitry 80, MPE budget distribution circuitry 80 may distribute the remaining MPE value $MPE_{REM}$ between the MPE budgets $BGT0_{MPE}$, ..., $BGTn_{MPE}$ provided to radios 28 (e.g., based on MPE distribution policy 122, MPE radio TX activity factors 126, MPE radio statuses 124, and/or MPE radio usage ratios 128).

MPE distribution policy 122 may identify which MPE radios 28 require MPE budget at a current point in time (e.g., because the radios already have a wireless connection established with external communication equipment). The MPE radios 28 that are actively communicating with external communications equipment and conveying a relatively large amount of data may, for example, require more MPE budget and may be allocated more MPE budget than the MPE radios 28 that are not actively communicating with the external communications equipment or that are conveying a relatively low amount of data). MPE radio statuses 124 may identify which MPE radios 28 are active or in an idle or sleep mode at any given time. MPE radios 28 that are active may, for example, require more MPE budget than MPE radios that are idle, inactive, or asleep. MPE radio TX activity factors 126 may identify the amount of transmit activity being used or expected to be used by each MPE radio 28. MPE radios 28 that have a high amount of actual or expected transmit activity may, for example, require more MPE budget than MPE radios that have a relatively small amount of actual or expected transmit activity. MPE radio usage ratios 128 may identify how much of past MPE budgets was actually used by MPE radios 28. An MPE radio 28 that used all or most of its allocated MPE budget during one or more of the previous instantaneous periods and/or averaging periods may, for example, require more MPE budget during the next instantaneous period than MPE radios 28 that used relatively little of its MPE budget during the previous instantaneous periods.

Once MPE budget distribution circuitry 80 has generated (e.g., calculated, allocated, distributed, computed produced, etc.) MPE budgets $BGT0_{MPE}$, ..., $BGTn_{MPE}$, MPE budget distribution circuitry 80 may transmit MPE budgets $BGT0_{MPE}$, ..., $BGTn_{MPE}$ to radios 28 over control paths 30. Radios 28 may then transmit radio-frequency signals during a subsequent instantaneous period in accordance with its MPE budget as allocated/distributed by MPE budget distribution circuitry 80.

Figure 5:
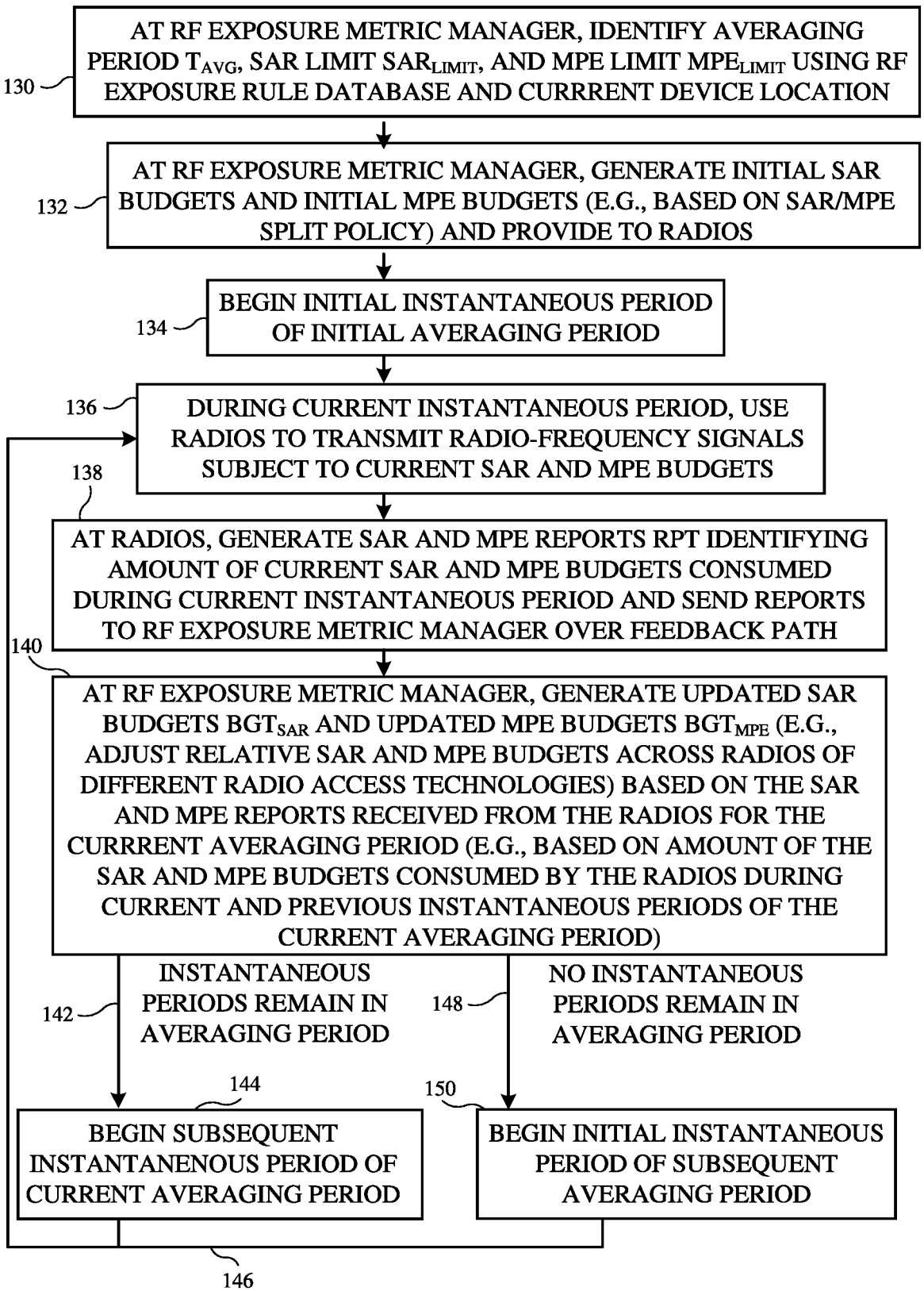
FIG. 5 is a flow chart of illustrative operations involved in using an RF exposure metric manager to dynamically adjust RF exposure metric budgets provided to different radios over time based on RF exposure metric feedback from the radios in accordance with some embodiments.

FIG. 5 is a flow chart of illustrative operations that may be performed by RF exposure metric manager 26 to iteratively and dynamically adjust the SAR budgets $BGT0_{SAR}$, ..., $BGTn_{SAR}$ and the MPE budgets $BGT0_{MPE}$, ..., $BGTn_{MPE}$ provided to radios 28 over time.

At operation 130, RF exposure metric manager 26 may identify the averaging period $T_{AVG}$, the SAR limit $SAR_{LIMIT}$, and the MPE limit $MPE_{LIMIT}$ that are currently applicable to device 10 from RF exposure rule database 42 (FIG. 2), based on its current geographic location (e.g., based on control signal dev_loc). SAR limit $SAR_{LIMIT}$ and MPE limit $MPE_{LIMIT}$ may be provided to total RF exposure calculation engine 36 over control path 45. Averaging period $T_{AVG}$ may be provided to total RF exposure calculation engine 36 over control path 44.

At operation 132 (e.g., during a first or initial iteration of the operations of FIG. 5), RF exposure metric manager 26 may generate initial SAR budgets $BGT0_{SAR}$, ..., $BGTn_{SAR}$ and initial MPE budgets $BGT0_{MPE}$, ..., $BGTn_{MPE}$ for radios 28. RF exposure metric manager 26 may provide the initial SAR budgets $BGT0_{SAR}$, ..., $BGTn_{SAR}$ and the initial MPE budgets $BGT0_{MPE}$, ..., $BGTn_{MPE}$ to radios 28 over control paths 30 (e.g., within RF exposure budgets BGT0, ..., BGTn of FIGS. 1 and 2). The initial instantaneous period of averaging period $T_{AVG}$ begins at operation 134.

At operation 136, radios 28 may transmit radio-frequency signals according to (based on) the initial SAR budgets $BGT0_{SAR}$, ..., $BGTn_{SAR}$ and the initial MPE budgets $BGT0_{MPE}$, ..., $BGTn_{MPE}$. This transmission occurs during the current instantaneous period of averaging period $T_{AVG}$ (e.g., during the initial instantaneous period and during a first iteration of the operations of FIG. 5). For example, the SAR radios 28 in wireless circuitry 24 may transmit radio-frequency signals at transmit power levels that are capped at maximum transmit power levels determined by the SAR radios from the corresponding initial SAR budget received from RF exposure metric manager 26. Similarly, the MPE radios 28 in wireless circuitry 24 may transmit radio-frequency signals at transmit power levels that are capped at maximum transmit power levels determined by the MPE radios from the corresponding initial MPE budget received from RF exposure metric manager 26.

At operation 138, radios 28 may generate SAR reports $SAR_0$, ..., $SAR_n$ (FIG. 2) and MPE reports $MPE_0$, ..., $MPE_n$ from the radio-frequency signals transmitted during the current instantaneous period. The SAR reports may be indicative of the amount of the current SAR budget consumed during the instantaneous period by each SAR radio. The MPE reports may be indicative of the amount of the current MPE budget consumed during the instantaneous period by each MPE radio. Radios 28 may provide the SAR reports $SAR_0$, ..., $SAR_n$ and the MPE reports $MPE_0$, ..., $MPE_n$ to total RF exposure calculation engine 36 in RF exposure metric manager 26 over feedback path 32 (e.g., as SAR/MPE reports RPT of FIGS. 1 and 2).

At operation 140, RF exposure metric manager 26 may dynamically adjust the SAR budgets and MPE budgets for radios 28 by generating updated SAR budgets $BGT0_{SAR}$, ..., $BGTn_{SAR}$ and updated MPE budgets $BGT0_{MPE}$, ..., $BGTn_{MPE}$ for radios 28 to use during the next instantaneous period of the averaging period. RF exposure metric manager 26 may generate updated SAR budgets $BGT0_{SAR}$, ..., $BGTn_{SAR}$ and updated MPE budgets $BGT0_{MPE}$, ..., $BGTn_{MPE}$ based on the SAR reports $SAR_0$, ..., $SAR_n$ and the MPE reports $MPE_0$, ..., $MPE_n$ produced by radios 28 during the current instantaneous period and, when available, the SAR reports SAR reports $SAR_0$, ..., $SAR_n$ and the MPE reports $MPE_0$, ..., $MPE_n$ and the MPE reports $MPE_0$, ..., $MPE_n$ produced by radios 28 during each prior instantaneous period of the averaging period (e.g., during previous iterations of the operations of FIG. 5). RF exposure metric manager 26 may also generate SAR budgets $BGT0_{SAR}$, ..., $BGTn_{SAR}$ and updated MPE budgets $BGT0_{MPE}$, ..., $BGTn_{MPE}$ based on SAR distribution policy 114, SAR radio TX activity factors 118, SAR radio statuses 116, SAR radio usage ratios 120, MPE distribution policy 122, MPE radio statuses 124, MPE radio TX activity factors 126, and/or MPE radio usage ratios 128 of FIG. 4.

If additional instantaneous periods remain in the current averaging period $T_{AVG}$, processing may proceed to operation 144 via path 142. At operation 144, the subsequent instantaneous period of the current averaging period $T_{AVG}$ begins. Processing then loops back to operation 136 (e.g., where the subsequent instantaneous period becomes the current instantaneous period). In this way words, RF exposure metric manager 26 may adjust the relative SAR budgets and MPE budgets across radios of different RATs based on the amount of previous SAR and MPE budgets consumed by radios 28 during each previous instantaneous period of the current averaging period, and based on SAR distribution policy 114, SAR radio TX activity factors 118, SAR radio statuses 116, SAR radio usage ratios 120, MPE distribution policy 122, MPE radio statuses 124, MPE radio TX activity factors 126, and/or MPE radio usage ratios 128.

Once no additional instantaneous periods remain in the current averaging period $T_{AVG}$, processing may proceed from operation 140 to operation 150 via path 148. At operation 150, the initial instantaneous period of a subsequent averaging period $T_{AVG}$ begins. Processing then loops back to operation 136 so RF exposure metric manager 26 can dynamically update the SAR and MPE budgets for radios 28 over the subsequent averaging period $T_{AVG}$. Processing may continue to iterate in this way to allow device 10 to continue to ensure that SAR and MPE budgets are efficiently allocated to radios as needed during device operation over time, while ensuring that the applicable regulatory limits (e.g., $SAR_{LIMIT}$ and $MPE_{LIMIT}$) continue to be met over each regulatory averaging period $T_{AVG}$ Processing may revert to operation 130 when device 10 moves to a geographic location having a different averaging period $T_{AVG}$, a different SAR limit $SAR_{LIMIT}$, and/or a different MPE limit $MPE_{LIMIT}$, or in response to any other desired trigger condition.

Figure 6:
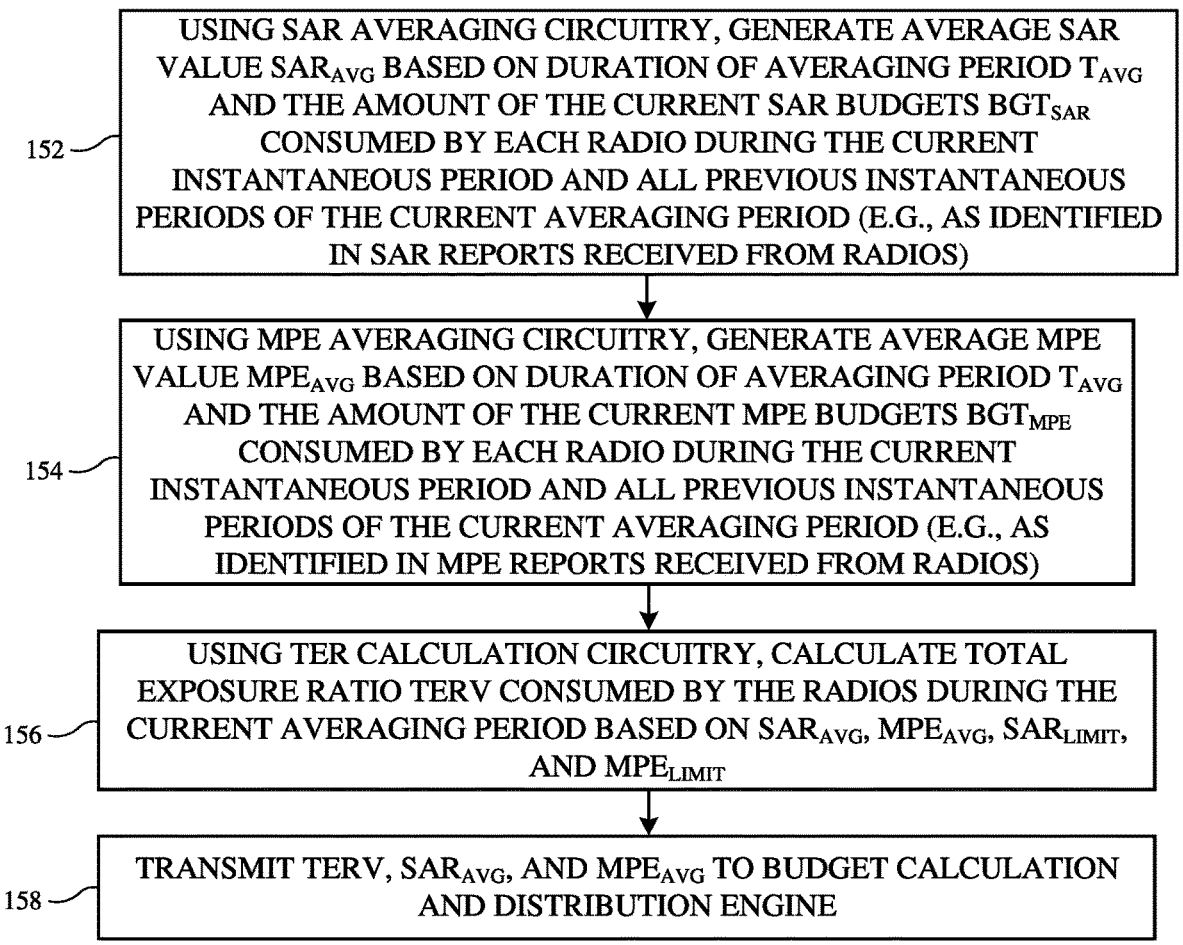
FIG. 6 is a flow chart of illustrative operations involved in using a total RF exposure calculation engine to generate RF exposure metric values for calculating updated RF exposure metric budgets in accordance with some embodiments.

FIG. 6 is a flow chart of illustrative operations that may be performed by total RF exposure calculation engine 36 (FIG. 3) in RF exposure metric manager 26 to generate average SAR value $SAR_{AVG}$, average MPE value $MPE_{AVG}$, and total exposure ratio value TERV based on SAR reports $SAR_0$, ..., $SAR_n$, MPE reports $MPE_0$, ..., $MPE_n$, averaging period $T_{AVG}$, SAR limit $SAR_{LIMIT}$ and MPE limit $MPE_{LIMIT}$. The operations of FIG. 6 may, for example, be performed during a given iteration of operation 140 of FIG. 5 (e.g., during a current instantaneous period of a current averaging period $T_{AVG}$).

At operation 152, SAR averaging circuitry 46 (FIG. 3) may generate average SAR value $SAR_{AVG}$ based on the SAR reports $SAR_0, \ldots, SAR_n$ received from radios 28 over feedback path 32 for the current instantaneous period and based on averaging period $T_{AVG}$. Adder 50 may add SAR reports $SAR_0, \ldots, SAR_n$ together to generate instantaneous SAR value $SAR_{INST}$, which is provided to time domain averager 54 and is stored at SAR value database 56 for future processing. SAR value database 56 may provide the instantaneous SAR value $SAR_{INST}$ produced by adder 50 for each previous instantaneous period of the current averaging period $T_{AVG}$ to time domain averager 54. Time domain averager 54 may average each instantaneous SAR value $SAR_{INST}$ produced during the current averaging period $T_{AVG}$ (e.g., for each previous instantaneous period of the current averaging period $T_{AVG}$) over the duration of the current averaging period $T_{AVG}$ to produce average SAR value $SAR_{AVG}$ (e.g., according to equation 1). SAR averaging circuitry 46 may provide average SAR value $SAR_{AVG}$ to TER calculation circuitry 73.

At operation 154, MPE averaging circuitry 48 may generate average MPE value $MPE_{AVG}$ based on the MPE reports $MPE_0, \ldots, MPE_n$ received from radios 28 over feedback path 32 for the current instantaneous period and based on averaging period $T_{AVG}$. Adder 64 may add MPE reports $MPE_0, \ldots, MPE_n$ together to generate instantaneous MPE value $MPE_{INST}$, which is provided to time domain averager 70 and is stored at MPE value database 66 for future processing. MPE value database 66 may provide the instantaneous MPE value $MPE_{INST}$ produced by adder 64 for each previous instantaneous period of the current averaging period $T_{AVG}$ to time domain averager 70. Time domain averager 70 may average each instantaneous MPE value $MPE_{INST}$ produced during the current averaging period $T_{AVG}$ (e.g., for each previous instantaneous period of the current averaging period $T_{AVG}$) over the duration of the current averaging period $T_{AVG}$ to produce average MPE value $MPE_{AVG}$ (e.g., according to equation 2). MPE averaging circuitry 48 may provide average MPE value $MPE_{AVG}$ to TER calculation circuitry 73.

At operation 156, TER calculation circuitry 73 may generate total exposure ratio value TERV based on average MPE value $MPE_{AVG}$, average SAR value $SAR_{AVG}$, SAR limit $SAR_{LIMIT}$, and MPE limit $MPE_{LIMIT}$ (e.g., according to equation 3).

At operation 158, TER calculation circuitry 73 may provide total exposure ratio value TERV, average MPE value $MPE_{AVG}$, and average SAR value $SAR_{AVG}$ to budget calculation and distribution engine 38 (FIG. 2). The example of FIG. 6 is merely illustrative. In practice, operations 152 and 154 may be performed concurrently or in reverse order if desired.

Figure 7:
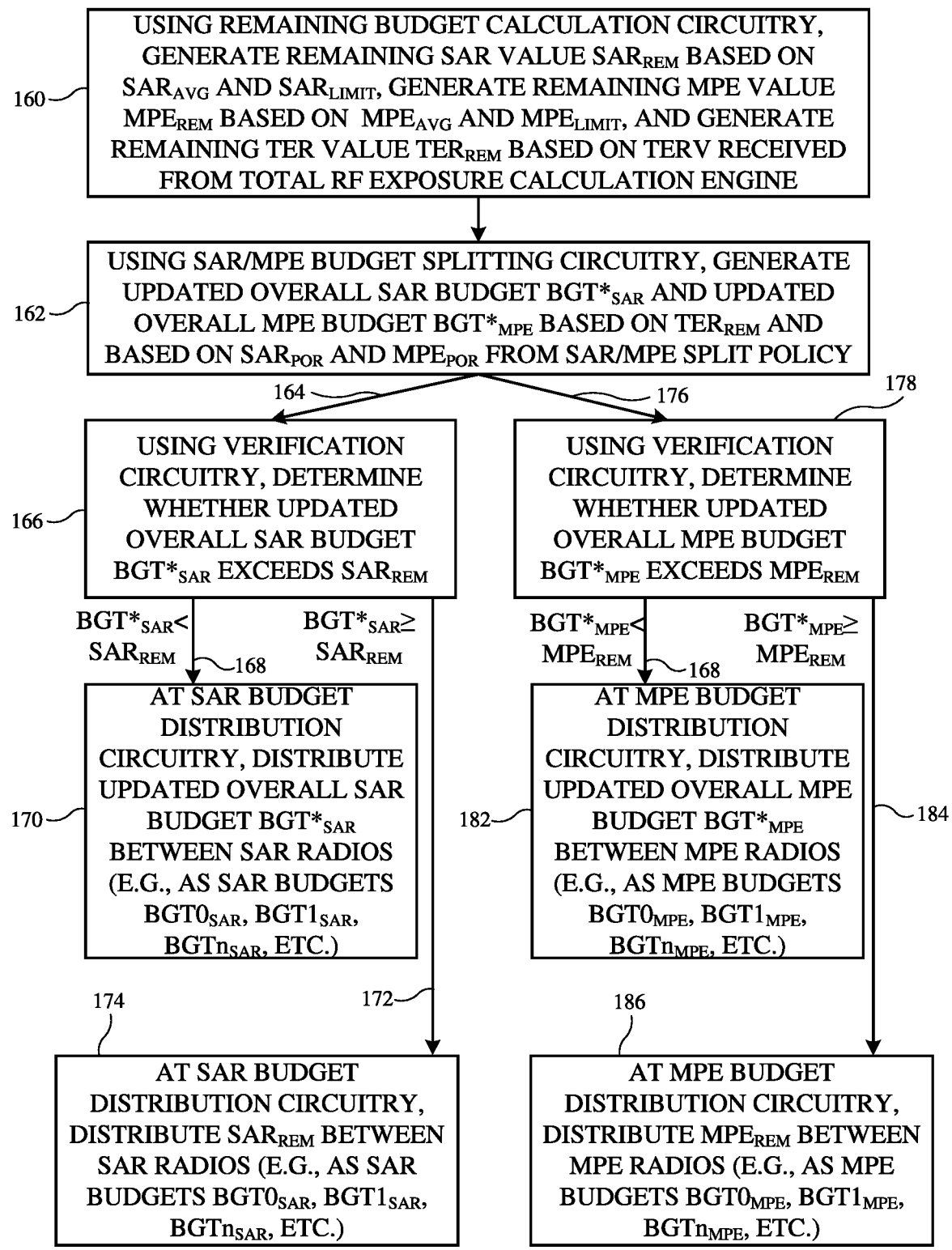
FIG. 7 is a flow chart of illustrative operations involved in using an RF exposure metric budget calculation and distribution engine to generate updated RF exposure metric budgets for different radios in accordance with some embodiments.

FIG. 7 is a flow chart of illustrative operations that may be performed by budget calculation and distribution engine 38 (FIG. 2) in RF exposure metric manager 26 to generate (updated) SAR budgets $BGT0_{SAR}, \ldots, BGTn_{SAR}$ and (updated) MPE budgets $BGT0_{MPE}, \ldots, BGTn_{MPE}$ for use by radios 28 in transmitting radio-frequency signals during the next instantaneous period.

At operation 160, remaining budget calculation circuitry 74 (FIG. 4) may generate remaining SAR value $SAR_{REM}$, remaining MPE value $MPE_{REM}$, and remaining TER value $TER_{REM}$ based on average SAR value $SAR_{AVG}$, average MPE value $MPE_{AVG}$, total exposure ratio value TERV, SAR limit $SAR_{LIMIT}$, and MPE limit $MPE_{LIMIT}$. For example, subtractor 82 may generate remaining SAR value $SAR_{REM}$ by subtracting average SAR value $SAR_{AVG}$ from SAR limit $SAR_{LIMIT}$. Subtractor 84 may generate remaining MPE value $MPE_{REM}$ by subtracting average MPE value $MPE_{AVG}$ from MPE limit $MPE_{LIMIT}$. Subtractor 86 may generate remaining TER value $TER_{REM}$ by subtracting total exposure ratio value TERV from the integer 1. Remaining budget calculation circuitry 74 may provide remaining SAR value $SAR_{REM}$ and remaining MPE value $MPE_{REM}$ to verification circuitry 94 in SAR/MPE budget splitting circuitry 76 over path 88. Remaining budget calculation circuitry 74 may provide remaining TER value $TER_{REM}$ to multipliers 96 and 98 in SAR/MPE budget splitting circuitry 76 over path 90.

At operation 162, multiplier 96 may generate overall SAR budget $BGT^*_{SAR}$ by multiplying SAR allocation $SAR_{POR}$ (e.g., from SAR/MPE split policy 92) by remaining TER value $TER_{REM}$. Multiplier 98 may concurrently generate overall MPE budget $BGT^*_{MPE}$ by multiplying MPE allocation $MPE_{POR}$ by remaining TER value $TER_{REM}$. Verification circuitry 94 may receive overall SAR budget $BGT^*_{SAR}$ over path 104 and may receive overall MPE budget $BGT^*_{MPE}$ over path 94. Processing may subsequently proceed to operation 166 via path 164 and operation 178 via path 176. Operations 166-174 may be performed concurrently with operations 178-186 or these operations may be performed in any desired sequence.

At operation 166, verification circuitry 94 may determine or identify whether overall SAR budget $BGT^*_{SAR}$ exceeds remaining SAR value $SAR_{REM}$. If overall SAR budget $BGT^*_{SAR}$ does not exceed (e.g., is less than) remaining SAR value $SAR_{REM}$, verification circuitry 94 may provide overall SAR budget $BGT^*_{SAR}$ to SAR budget distribution circuitry 78 for allocation between SAR radios 28, and processing may proceed to operation 170 via path 168.

At operation 170, SAR distribution circuitry 78 may allocate overall SAR budget $BGT^*_{SAR}$ across radios 28 by generating SAR budgets $BGT0_{SAR}, \ldots, BGTn_{SAR}$ for each radio 28 based on overall SAR budget $BGT^*_{SAR}$, SAR distribution policy 114, SAR radio TX activity factors 118, SAR radio statuses 116, and SAR radio usage ratios 120. SAR budget distribution circuitry 78 may provide a respective SAR budget to each corresponding radio 28 for transmission during the next instantaneous period (e.g., at operation 136 of FIG. 5).

If overall SAR budget $BGT^*_{SAR}$ exceeds (e.g., is greater than or equal to) remaining SAR value $SAR_{REM}$ (at operation 166), verification circuitry 94 may provide remaining SAR value $SAR_{REM}$ to SAR budget distribution circuitry 78 for allocation between SAR radios 28, and processing may proceed to operation 174 via path 172.

At operation 174, SAR budget distribution circuitry 78 may allocate remaining SAR value $SAR_{REM}$ across radios 28 by generating SAR budgets $BGT0_{SAR}, \ldots, BGTn_{SAR}$ for each radio 28 based on remaining SAR value $SAR_{REM}$, SAR distribution policy 114, SAR radio TX activity factors 118, SAR radio statuses 116, and SAR radio usage ratios 120. SAR budget distribution circuitry 78 may provide a respective SAR budget to each corresponding radio 28 for transmission during the next instantaneous period (e.g., at operation 136 of FIG. 5).

At operation 178, verification circuitry 94 may determine or identify whether overall MPE budget $BGT^*_{MPE}$ exceeds remaining MPE value $MPE_{REM}$. If overall MPE budget $BGT^*_{MPE}$ does not exceed remaining MPE value $MPE_{REM}$, verification circuitry 94 may provide overall MPE budget $BGT^*_{MPE}$ to MPE budget distribution circuitry 80 for allocation between MPE radios 28, and processing may proceed to operation 182 via path 180.

At operation 182, MPE budget distribution circuitry 80 may allocate overall MPE budget BGT*$_{MPE}$ across radios 28 by generating MPE budgets BGT0$_{MPE}$, . . . , BGTn$_{MPE}$ for each radio 28 based on overall MPE budget BGT*$_{MPE}$, MPE distribution policy 122, MPE radio TX activity factors 126, MPE radio statuses 124, and MPE radio usage ratios 128. MPE budget distribution circuitry 80 may provide a respective MPE budget to each corresponding radio 28 for transmission during the next instantaneous period (e.g., at operation 136 of FIG. 5).

If overall MPE budget BGT*$_{MPE}$ exceeds remaining MPE value MPE$_{REM}$ (at operation 178), verification circuitry 94 may provide remaining MPE value MPE$_{REM}$ to MPE budget distribution circuitry 80 for allocation between MPE radios 28, and processing may proceed to operation 186 via path 184.

At operation 186, MPE budget distribution circuitry 80 may allocate remaining MPE value MPE$_{REM}$ across radios 28 by generating MPE budgets BGT0$_{MPE}$, . . . , BGTn$_{MPE}$ for each radio 28 based on remaining MPE value MPE$_{REM}$, MPE distribution policy 122, MPE radio TX activity factors 126, MPE radio statuses 124, and MPE radio usage ratios 128. MPE budget distribution circuitry 80 may provide a respective MPE budget to each corresponding radio 28 for transmission during the next instantaneous period (e.g., at operation 136 of FIG. 5).

By dynamically adjusting SAR and MPE budgets across radios 28, RF exposure metric manager 26 may enable dynamic, cross-technology, SAR and MPE budget sharing such that the SAR and MPE budgets for each radio can be dynamically adjusted as required for each specific use case or scenario. SAR or MPE budget not used during a previous instantaneous period can be reassigned and used in future instantaneous periods either by the same radio or by a different radio. This may result in improved utilization of the total available SAR and MPE budget. This may in turn lead to increased uplink coverage relative to scenarios where static SAR/MPE budgets are used, as the total available SAR and MPE budget is utilized to a larger extent, allowing for higher average TX power and less TX power back-off required by the radios. Increased TX power applied by the radio also leads to better uplink coverage for the radio relative to scenarios where static SAR/MPE budgets are used. In addition, device 10 may be able to increase its duty cycle and thus exhibit increased uplink throughput relative to scenarios where static SAR/MPE budgets are used.

The methods and operations described above in connection with FIGS. 1-7 (e.g., the operations of FIGS. 5-7) may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., storage circuitry 16 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., processing circuitry 18 of FIG. 1, etc.). The processing circuitry may include microprocessors, central processing units (CPUs), application-specific integrated circuits with processing circuitry, or other processing circuitry. The components of FIGS. 1-4 may be implemented using hardware (e.g., circuit components, digital logic gates, one or more processors, etc.) and/or using software where applicable. While databases are sometimes described herein as providing data to other components (see, e.g., SAR value database 56 of FIG. 3, MPE value database 66 of FIG. 6, RF exposure rule database 42 of FIG. 2, etc.), one or more processors, memory controllers, or other components may actively access the databases, may retrieve the stored data from the database, and may pass the retrieved data to the other components for corresponding processing. The regulatory SAR limit, MPE limit, and averaging times described herein need not be imposed by a government or regulatory body and may additionally or alternatively be imposed by a network operator, base station, or access point of a wireless network in which device 10 operates, by device 10 itself, by the manufacturer or designer of some or all of device 10, by wireless industry standards, protocols, or practices, by software running on device 10, etc.

The foregoing is merely illustrative and various modifications can be made to the described embodiments. The foregoing embodiments may be implemented individually or in any combination.

What is claimed is:

1. An electronic device comprising:
   a first radio configured to wirelessly transmit first radio-frequency signals during a first period and pursuant to a first radio-frequency (RF) exposure metric budget; and
   a second radio configured to wirelessly transmit second radio-frequency signals during the first period and pursuant to a second RF exposure metric budget, wherein the first radio is configured to transmit third radio-frequency signals during a second period subsequent to the first period and pursuant to an updated first RF exposure metric budget that is based on an amount of an RF exposure metric consumed by the second radio during the first period.

2. The electronic device of claim 1, wherein the first period is a first subperiod of a regulatory averaging period and the second period is a second subperiod of the regulatory averaging period.

3. The electronic device of claim 1, wherein the first radio is configured to wirelessly transmit the first radio-frequency signals at a frequency less than 6 GHz, the second radio is configured to wirelessly transmit the second radio-frequency signals at a frequency greater than 6 GHz, and the RF exposure metric comprises maximum permissible exposure (MPE).

4. The electronic device of claim 1, wherein the first radio is configured to wirelessly transmit the first radio-frequency signals at a frequency greater than 6 GHz, the second radio is configured to wirelessly transmit the second radio-frequency signals at a frequency less than 6 GHz, and the RF exposure metric comprises specific absorption rate (SAR).

5. The electronic device of claim 1, wherein the second radio is configured to transmit fourth radio-frequency signals during the second period pursuant to an updated second RF exposure metric budget that is based on an amount of an additional RF exposure metric consumed by the first radio during the first period.

6. The electronic device of claim 1, further comprising:
   a third radio configured to wirelessly transmit fourth radio-frequency signals during the first period and pursuant to a third RF exposure metric budget, wherein the updated first RF exposure metric budget is based on an amount of an additional RF exposure metric consumed by the third radio during the first period.

7. The electronic device of claim 1, wherein the first RF exposure metric budget and the second RF exposure metric budget are portions of an overall RF exposure metric budget for the electronic device.

8. A method of operating an electronic device having a set of radios, the method comprising:
- with the set of radios, transmitting first radio-frequency signals during a first period; and
- with the set of radios, transmitting second radio-frequency signals during a second period subsequent to the first period according to a radio-frequency (RF) exposure metric budget that is based on an average amount of an RF exposure metric consumed by the set of radios during the first period with an amount of the RF exposure metric consumed by the set of radios during at least a third period prior to the first period.

9. The method of claim 8, wherein the RF exposure metric comprises maximum permissible exposure (MPE).

10. The method of claim 8, wherein the RF exposure metric comprises specific absorption rate (SAR).

11. The method of claim 8, further comprising:
- with one or more processors, splitting the RF exposure metric budget between with set of radios based on a split policy.

12. The method of claim 11, wherein splitting the RF exposure metric budget comprises splitting the RF exposure metric budget based at least in part on which radios in the set of radios are inactive during the first period.

13. The method of claim 11, wherein splitting the RF exposure metric budget comprises splitting the RF exposure metric budget based at least in part on radio usage ratios associated with transmission by the set of radios during the first period.

14. The method of claim 11, wherein splitting the RF exposure metric budget comprises splitting the RF exposure metric budget based at least in part on transmit activity factors associated with transmission by the set of radios during a first subperiod.

15. The method of claim 8, wherein the first period is a first subperiod of a regulatory averaging period and the second period is a second subperiod of the regulatory averaging period.

16. An electronic device comprising:
- a first radio configured to transmit first radio-frequency signals at a first frequency during a first period; and
- a second radio configured to transmit second radio-frequency signals at a second frequency greater than the first frequency during the first period, wherein the first radio is configured to transmit third radio-frequency signals at the first frequency during a third period subsequent to the first period according to a radio-frequency (RF) exposure budget that is based on an average specific absorption rate (SAR) consumed by at least the first radio during the first period and during at least a second period prior to the first period and that is based on an average maximum permissible exposure (MPE) consumed by at least the second radio during the first period and during at least the second period.

17. The electronic device of claim 16, wherein the second radio is configured to transmit fourth radio-frequency signals at the second frequency during the third period according to an additional RF exposure budget that is based on the average SAR and the average MPE.

18. The electronic device of claim 17, wherein the additional RF exposure budget is based on a first limit on an amount of SAR consumed by the electronic device over an averaging period and a second limit on an amount of MPE consumed by the electronic device over the averaging period.

19. The electronic device of claim 16, wherein the RF exposure budget is based on a first limit on an amount of SAR consumed by the electronic device over an averaging period and a second limit on an amount of MPE consumed by the electronic device over the averaging period.

20. The electronic device of claim 16, further comprising one or more antennas configured to transmit the first radio-frequency signals and the second radio-frequency signals.

\* \* \* \* \*

UNITED STATES PATENT AND TRADEMARK OFFICE
CERTIFICATE OF CORRECTION

PATENT NO. : 12,316,366 B2
APPLICATION NO. : 17/868513
DATED : May 27, 2025
INVENTOR(S) : Sharad Sambhwani et al.

It is certified that error appears in the above-identified patent and that said Letters Patent is hereby corrected as shown below:

In the Claims

Column 27, Line 25, Claim 11 "between with" should read -- between the --

Signed and Sealed this
Twenty-ninth Day of July, 2025

Coke Morgan Stewart
*Acting Director of the United States Patent and Trademark Office*